(12) United States Patent
Childers et al.

(10) Patent No.: US 12,554,742 B1
(45) Date of Patent: Feb. 17, 2026

(54) SYSTEM AND METHOD FOR ESTABLISHING RANGE LINK BETWEEN SOURCE AND DESTINATION RANGES

(71) Applicant: WORKIVA INC., Ames, IA (US)

(72) Inventors: Kaitlyn Alise Childers, Port Charlotte, FL (US); Joshua John Przybyszewski, Ames, IA (US); Gabriela Plamenova Georgieva, Columbia, MO (US); Jacob Johnson, Ames, IA (US)

(73) Assignee: WORKIVA INC., Ames, IA (US)

( * ) Notice: Subject to any disclaimer, the term of this patent is extended or adjusted under 35 U.S.C. 154(b) by 0 days.

(21) Appl. No.: 18/932,813

(22) Filed: Oct. 31, 2024

(51) Int. Cl.
*G06F 16/00* (2019.01)
*G06F 16/27* (2019.01)

(52) U.S. Cl.
CPC .................................. *G06F 16/27* (2019.01)

(58) Field of Classification Search
CPC .... G06F 3/0482; G06F 3/04842; G06F 40/18; G06F 21/602; G06F 21/554; G06F 21/604; G06F 2221/2141
See application file for complete search history.

(56) References Cited

U.S. PATENT DOCUMENTS

| | | | | |
|---|---|---|---|---|
| 8,099,663 | B2 * | 1/2012 | Mayor | G06F 16/9024 |
| | | | | 380/243 |
| 8,250,461 | B2 * | 8/2012 | Bauchot | G06F 3/0482 |
| | | | | 715/219 |
| 9,898,449 | B1 * | 2/2018 | Matthes | G06F 40/197 |
| 10,635,744 | B2 * | 4/2020 | Beth | G06F 16/282 |
| 11,354,362 | B1 * | 6/2022 | Harper | G06F 16/322 |
| 11,635,897 | B2 * | 4/2023 | Shani | G06F 3/0679 |
| | | | | 711/154 |
| 2006/0069696 | A1 * | 3/2006 | Becker | G06F 40/18 |
| | | | | 707/999.102 |
| 2021/0319172 | A1 * | 10/2021 | Anderson | G06F 16/93 |
| 2024/0028240 | A1 * | 1/2024 | Shani | G06F 3/0608 |

* cited by examiner

*Primary Examiner* — Yicun Wu
(74) *Attorney, Agent, or Firm* — Faegre Drinker Biddle & Reath LLP

(57) ABSTRACT

Systems and methods for establishing a range link between source and destination ranges that may provide more efficient synchronization between source and destination documents are provided. In particular, a computing device may create a first source range from a range of cells in a source document, create a first destination range in a destination document by creating a range link between the first source range and the first destination range to replicate the first source range, receive an indication to publish a second source range to the destination range, the second source range including a structural change to the first source range, and in response to the receipt of the indication to publish the second source range, update the range link between the first source range and the first destination range to propagate the structural change to create a second destination range.

20 Claims, 18 Drawing Sheets

SYSTEM AND METHOD FOR ESTABLISHING RANGE LINK BETWEEN SOURCE AND DESTINATION RANGES

TECHNICAL FIELD

The present disclosure relates generally to electronic document management and, more particularly, to a system and method for establishing a range link between source and destination ranges in electronic documents.

BACKGROUND

In systems configured to maintain electronic documents, users may establish links between a data source and multiple destinations for data synchronization (e.g., table cell). However, structural changes (e.g., adding/removing rows/columns in a table) are not automatically propagated, thereby necessitating manual replication of alterations at each destination and the creation of new links which is a time-consuming and error-prone process. In some scenarios, it may be desirable to link ranges of data between source and destination tables or spreadsheets to establish structural change synchronization.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

In systems configured to maintain electronic documents, users may establish links between a data source and multiple destinations for data synchronization (e.g., table cell). For example, a user may create a report (e.g., a table or a spreadsheet) at a source document and include the report at multiple destinations documents. The user may create cell links between the ranges of cells within the reports, such that any changes in data values in the source report are pushed to the destination report. However, since only cells are linked, any structural changes (e.g., adding/removing rows/ columns in a table) to the source report are not automatically propagated to the destination reports. As such, the user would need to manually replicate the structural changes of the source reports at each destination report, which is a time-consuming and error-prone process.

In accordance with at least one example of the present disclosure, systems and methods for establishing a range link between source and destination ranges that may provide more efficient synchronization between source and destination documents are provided. To do so, a range sync between the source and destination ranges is created to synchronize the table structure by coordinating cell locations between synchronized ranges to replicate any structural change (e.g., insert, sort, drag, drop, etc.). This allows the users to publish or push structural modifications from the source document to all the destination documents rather than pulling from each destination document. Additionally, cell links between the cells (e.g., point-to-point linking) in the source and destination ranges are created to allow flow through of data values, formats, and metadata (e.g., comments, attachments, XBRL). In other words, each cell within a linked range has an individual cell link.

Figure 1:
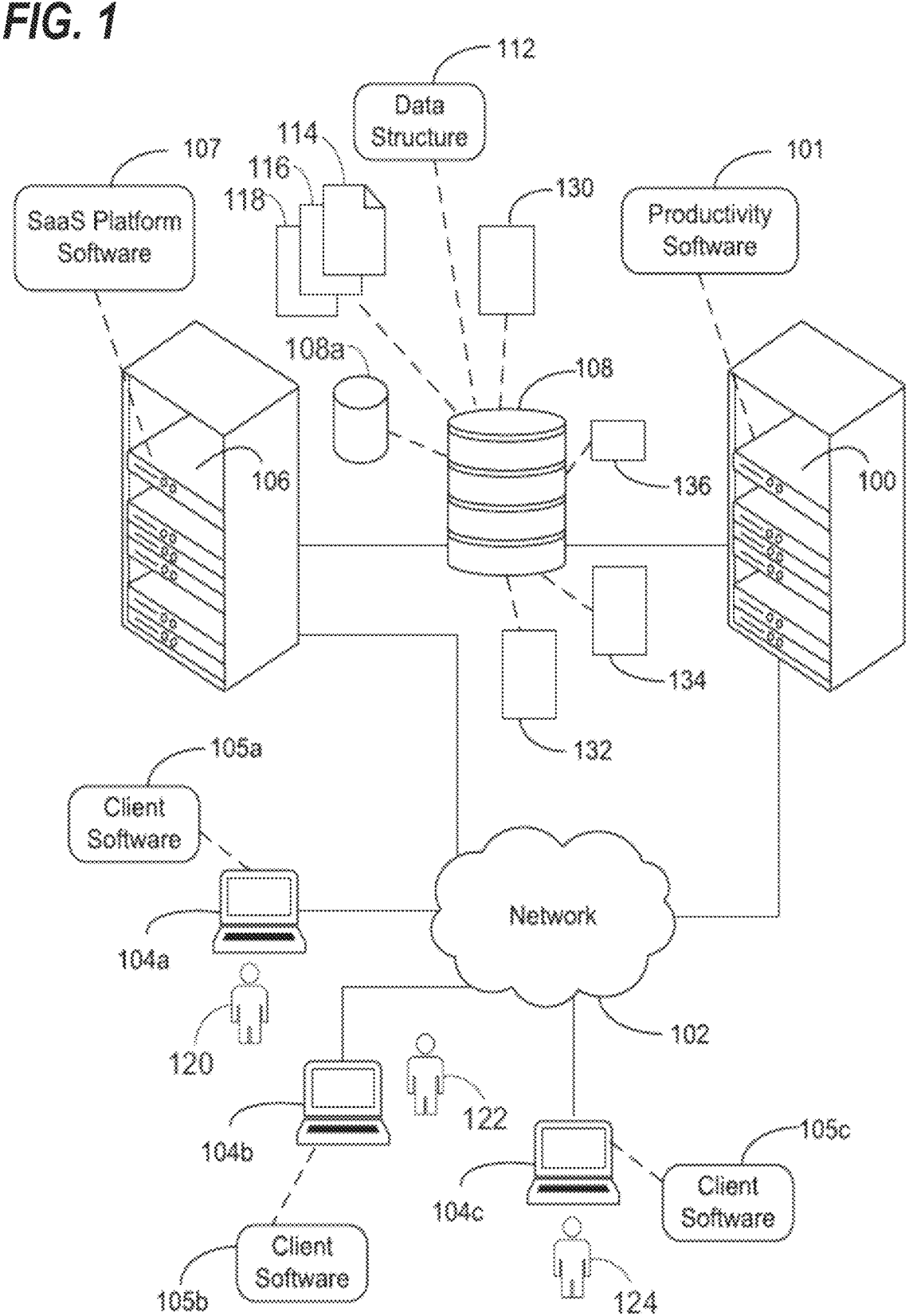
FIG. 1 is an example of a networking environment in which various embodiments of the disclosure may be implemented, according to an embodiment.

Turning to FIG. 1, an example of a computer networking environment in which various embodiments of the disclosure may be implemented is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104a, a third computing device 104b, a fourth computing device 104c, and a fifth computing device 106. The fifth computing device 106 is communicatively linked to a media storage device 108 (e.g., a redundant array of independent disks). For the sake of example, it is assumed that a first user 120 operates the second computing device 104a, a second user 122 operates the third computing device 104b, and a third user 124 operates the fourth computing device 104c. Each of the computing devices 104a, 104b, and 104c executes client software (reference numerals 105a, 105b, and 105c, respectively). One possible implementation of the client software is a web browser.

Residing within the media storage device 108 is a database 108a containing multiple documents, three of which are depicted in FIG. 1: a first document 114, a second document 116, and a third document 118. The first computing device 100 and the fifth computing device 106 are depicted as rack-mounted servers, while the second, third, and fourth computing devices 104a, 104b, and 104c are depicted as notebook computers. However, the computing devices depicted in FIG. 1 are merely representative. Other possible implementations of a computing device include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

In various embodiments, at least some documents are stored using a suitable data structure configured to maintain links and references between cells, tables, paragraphs, sections, or other suitable portions of a document. In an embodiment, documents are stored using an RTree data structure. In another embodiment, documents are stored using a causal tree data structure.

In an embodiment, the system includes a computing device that configures the computer memory according to a causal tree (a type of logic tree) representing a structure of a document. The computer memory may be internal to or external to the computing device. Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node and a collection of observation instances, from which all other instruction nodes branch. Except for the root node and observations, each editing instruction in the document is caused by whichever editing instruction that came before it. Every editing instruction is aware of the ID of its parent instruction, i.e., the instruction that "caused" it. In an embodiment, each instruction (other than the root node and observations) in the document may be represented as a 3-tuple: ID (ID of the instruction), CauseID (ID of the parent instruction), and Value (value of the instruction). Observations have a 3-tuple: ID (ID of the instruction), Start ID (ID of the first character in a range), and Stop ID (ID of character immediately after the last character in a range unless the same as the Start ID which indicates only a single character is to be observed). Additional instructions may be added to an observation to provide additional information or to modify the range being observed. Examples of observations are discussed in U.S. patent application Ser. No. 16/871,512.

In an embodiment, the system includes a computing device that configures the computer memory according to an RTree (a type of logic tree) representing a structure of a spreadsheet or other document. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR.

For convenient reference, the first computing device 100 will also be referred to as a "productivity server 100" and the fifth computing device 106 will also be referred to as a "database server 106." Although depicted in FIG. 1 as separate devices, in some embodiments, the functionality of the productivity server 100 and the database server 106 are on the same device. The productivity server 100 executes productivity software 101 to provide document collaboration services. The database server 106 executes Software-as-a-Service ("SaaS") platform software 107 to provide database services to the productivity software 101, such as maintaining the contents of the database 108a and providing a programming platform for various processes launched by the productivity software (e.g., to manipulate, store, and retrieve documents and other information from the database 108a). Under the control of the productivity software 101, the productivity server 100 interacts with the database server 106 (which operates under the control of the SaaS platform software 107) and the computing devices 104a, 104b, and 104c (also referred to as "client devices") to allow the computing devices to access the first document 114, the second document 116, and the third document 118 so that the first user 120, the second user 122, and the third user 124 can share contents of the documents (e.g., copy and paste a table between documents).

In an embodiment, documents maintained on the media storage device 108 may be organized into sections, with each section (e.g., the contents of the section) being maintained in its own separate data structure referred to as a "section entity." For example, the first document 114 in FIG. 1 has a first section represented by a first section entity 130, a second section represented by a second section entity 132, and a third section represented by a third section entity 134. The productivity software 101 uses an outline entity 136 (also stored on the media storage device) to determine how the sections are organized.

Figure 2:
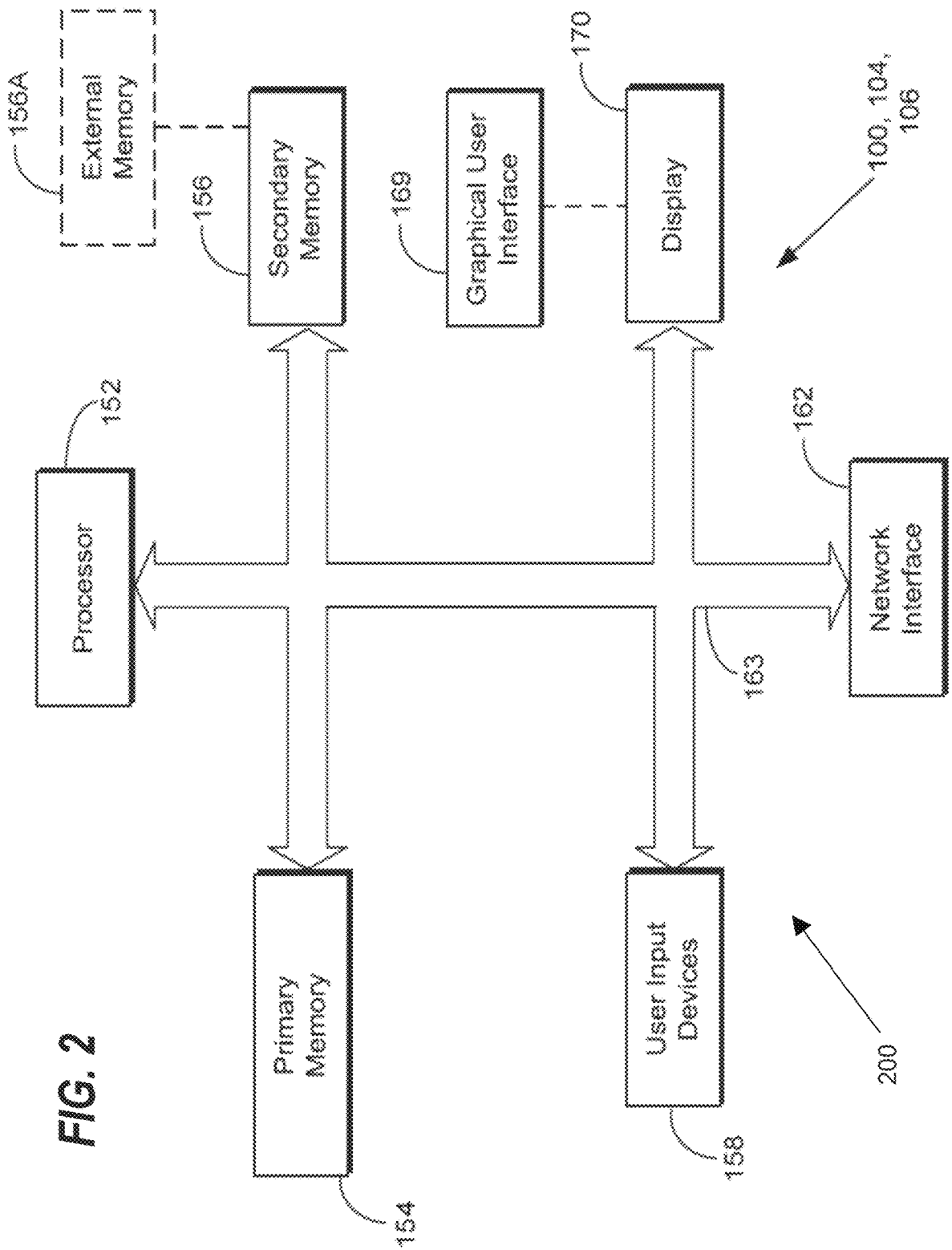
FIG. 2 is a block diagram of a computing device, according to an embodiment.

FIG. 2 is a block diagram of a computing device 200, according to an embodiment. One or more of the computing devices of FIG. 1 (including the media storage device 108) have the general architecture shown in FIG. 2, in various embodiments. The device depicted in FIG. 2 includes a processor 152 (e.g., a microprocessor, controller, or application-specific integrated circuit), a primary memory 154 (e.g., volatile memory, random-access memory), a secondary memory 156 (e.g., non-volatile memory, solid state drive, hard disk drive), user input devices 158 (e.g., a keyboard, mouse, or touchscreen), a display 160 (e.g., an organic, light-emitting diode display), and a network interface 162 (which may be wired or wireless). The memories 154 and 156 store instructions and data. The processor 152 executes the instructions and uses the data to carry out various procedures including, in some embodiments, the methods described herein.

Each of the elements of FIG. 2 is communicatively linked to one or more other elements via one or more data pathways 163. Possible implementations of the data pathways 163 include wires, conductive pathways on a microchip, and wireless connections. In an embodiment, the processor 152 is one of multiple processors in the computing device, each of which is capable of executing one or more separate threads. In an embodiment, the processor 152 communicates with other processors external to the computing device in order to initiate the execution of different threads on those other processors.

The term "local memory" as used herein refers to one or both of the memories 154 and 156 (i.e., memory accessible by the processor 152 within the computing device). In some embodiments, the secondary memory 156 is implemented as, or supplemented by an external memory 156A. The media storage device 108 is a possible implementation of the external memory 156A. The processor 152 executes the instructions and uses the data to carry out various procedures including, in some embodiments, the methods described herein, including displaying a graphical user interface 169. The graphical user interface 169 is, according to one embodiment, software that the processor 152 executes to display a report (e.g., a table or a spreadsheet) on the display device 160, and which permits a user to make inputs into the report via the user input devices 168.

The computing devices of FIG. 1 (i.e., the processor 152 of each of the computing devices) are able to communicate with other devices of FIG. 1 via the network interface 162 over the network 102. In an embodiment, this communication takes place via a user interface that the productivity server 150 provides to the computing devices 154a, 154b, and 154c. The specific nature of the user interface and what the user interface shows at any given time may vary depending on what the user has chosen to view. Also, multiple users may interact with different instances of the user interface on different devices. In some embodiments, the productivity server 150 carries out calculations to determine how content is to be rendered on a computing device, generates rendering instructions based on those calculations, and transmits those rendering instructions to the computing device. Using the received instructions, the computing device renders the content on a display. In other embodiments, the productivity server 150 transmits instructions regarding an asset to a computing device. In carrying out the received instructions, the computing device performs the appropriate calculations locally to render the content of the asset on a display.

Figure 3:
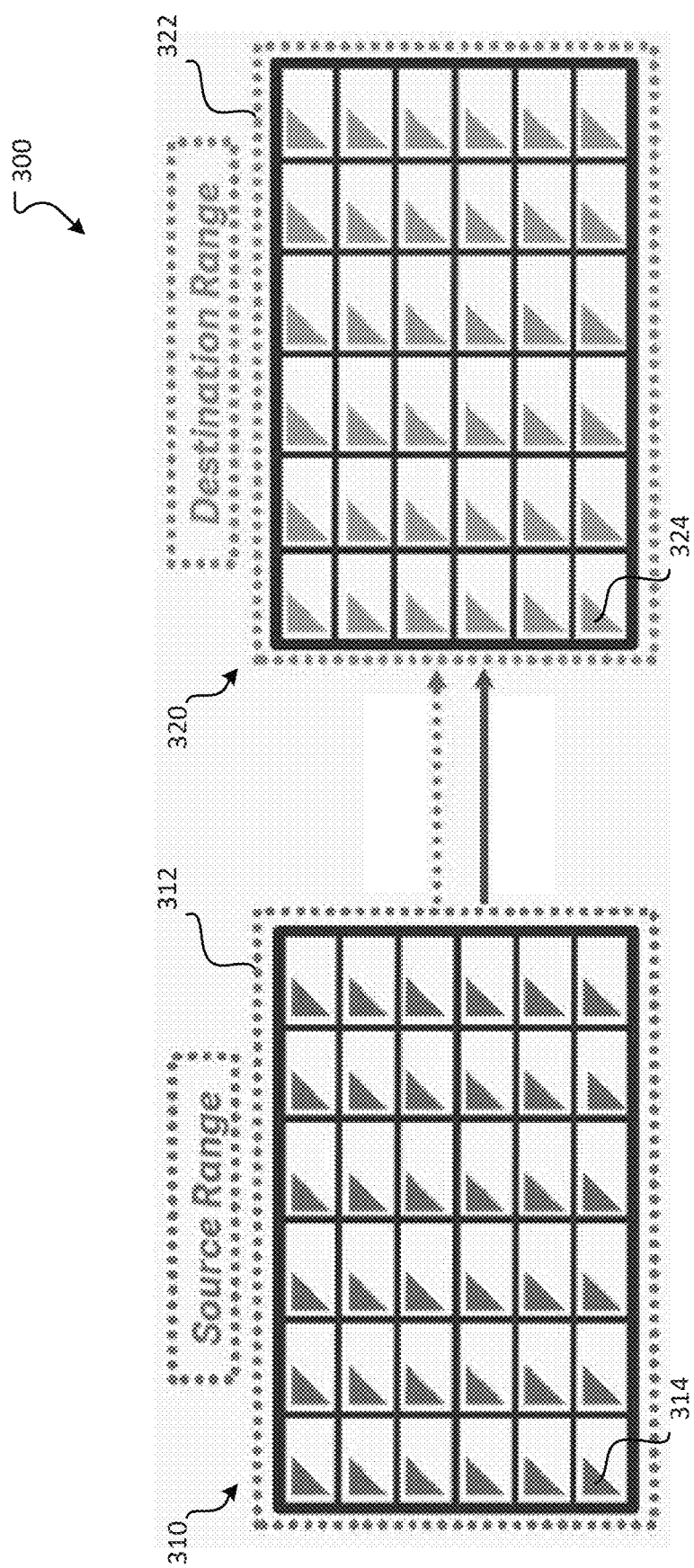
FIG. 3 is an exemplary block diagram illustrating a range link establishment between source and destination ranges, according to an embodiment.

FIG. 3 is an exemplary block diagram illustrating a range link establishment between source and destination ranges, according to an embodiment. As described further below, linking the source and destination ranges includes synchronizing structural modifications from the source range to the destination range and creating cell links between the source and destination ranges to flow through cell values, formats, and/or metadata (e.g., comments, attachments, XBRL). In other words, each cell within a linked range has an individual cell link. To do so, a user may create a source range 310 within a source document (e.g., a spreadsheet) by selecting a range of cells (e.g., a table) and creating a range link for the selected range of cells. Once the range link is created, a source range link indicator 312 appears around the selected range of cells outlining the source range 310.

The user may then create a destination range 320 within a destination document that is linked to the source range 310. To do so, the user may select (e.g., copy) the source range 310 and insert (e.g., paste) it as a range link to the destination document. In some embodiments, a notification may appear indicating that pasting as a range link will restrict the table to the linked range. When the range link paste is confirmed, the copied range of cells appears in the destination document and a destination range link indicator 322 appears around the pasted range of cells outlining the destination range 320. It should be appreciated that multiple destination ranges 320 may be created in multiple destination documents, and each destination range 320 is linked to the source range 310. In other words, any changes to the source range 310 will be published to (e.g., synchronized with) each of the destination ranges 320. In other words, the range link indicator 312 indicates whether there are any changes (e.g., a new row or column) made to the source range 310 that have not been published to the destination range 320. In the illustrative embodiment, a different color coding may be used to denote the publish state of the range link. For example, the range indicator 312 may transition to a different color if any changes are detected within the source range 310 (e.g., structural changes to the source range 310 or any unpublished cell links in the source range 310).

Additionally, each cell in the source range 310 and the destination range 320 is marked with a respective cell link indicator 314, 324 indicating the publish state of a cell link of an individual cell within the range link. In other words, each cell in the range link participates in cell attribute (e.g., cell-level value, formatting, and/or metadata) synchronization, and the cell link indicator 314, 324 indicates the respective cell's participation in the cell attribute synchronization. For example, once the range link is established in the source document, a cell link is created for each cell in the source range 310 and each cell in the source range 310 is denoted with a cell link indicator 314 (e.g., a blue triangle indicator). In other words, the presence of the cell link indicator 314 within the source range 310 indicates that the range link is created for the source range 310 and each cell within the source range 310 has an individual cell link. In the illustrative embodiment, a different color coding may be used to denote the publish state of a cell link of an individual cell within the range link. Additionally, the cell link indicator 314 within the source range 310 may further indicate whether the respective cell has been published to the destination range 320. For example, when a cell within the range link becomes unpublished, the range link becomes unpublished and is denoted with the range link indicator 312 (e.g., by transitioning to a different color). When the range link is published, the cell link indicator 314 returns to the blue published status, and the blue cell link indicators 314 are added to any newly added cells which are now linked as of the publish.

Similarly, when the range link is established in the destination document, each cell of the destination range 320 is denoted with a cell link indicator 324. For example, a new destination range 320 may be created by copying the source range 310 and pasting it as a range link in the destination document, and each cell in the destination range 320 is denoted with a green triangle indicator 324. Additionally, the destination range 320 itself is denoted with the range link indicator 322 (e.g., a rectangular indicator bordering the range link).

In other words, the range link indicators 312, 322 and the cell link indicators 314, 324 indicate that the range link is established for managing links within the source and destination ranges, such that any changes in structure and/or value in the source range 310 are propagated to the linked destination range 320. It should be appreciated that, in some embodiments, the source range 310 and the destination range 320 may only include the range link indicators 312, 322 without the cell link indicators 314, 324.

Each of the source range 310 and the destination range 320 gets its own set of protections. For example, the source range 310 is protected to prevent the user from accidentally causing a source range link to become deleted. If a source range link is range A1:C3, the user will not be able to perform the deletion of columns A:C because that would cause the whole source range to be deleted. The sheet or table containing the source range is protected from removal or deletion until the source range link 312 is removed. If the user attempts to remove the source range link, a notification is provided to the user indicating that the removal of the source range link will remove all destination range links and prompting the user for confirmation. When the source range link is removed, any associated destination ranges will also be removed. However, the table content including cell-level links will be intact.

Additionally, the destination range 320 is protected from any structural modification (e.g., row/column insertions or removals, individual cell link removals, and/or an expansion of the table outside of the destination range) to the destination range 320, such that users cannot manually modify the structure of the destination range 320 or remove cells or links within the destination range 320. For example, if a destination range link is from A1:C3, the user will not be able to perform the insertion of a row between row 1 and 2 because that would cause a structural change to the destination range link. This is to ensure that the destination range 320 corresponds to the source range 310 in terms of cell and link locations.

Figure 4A:
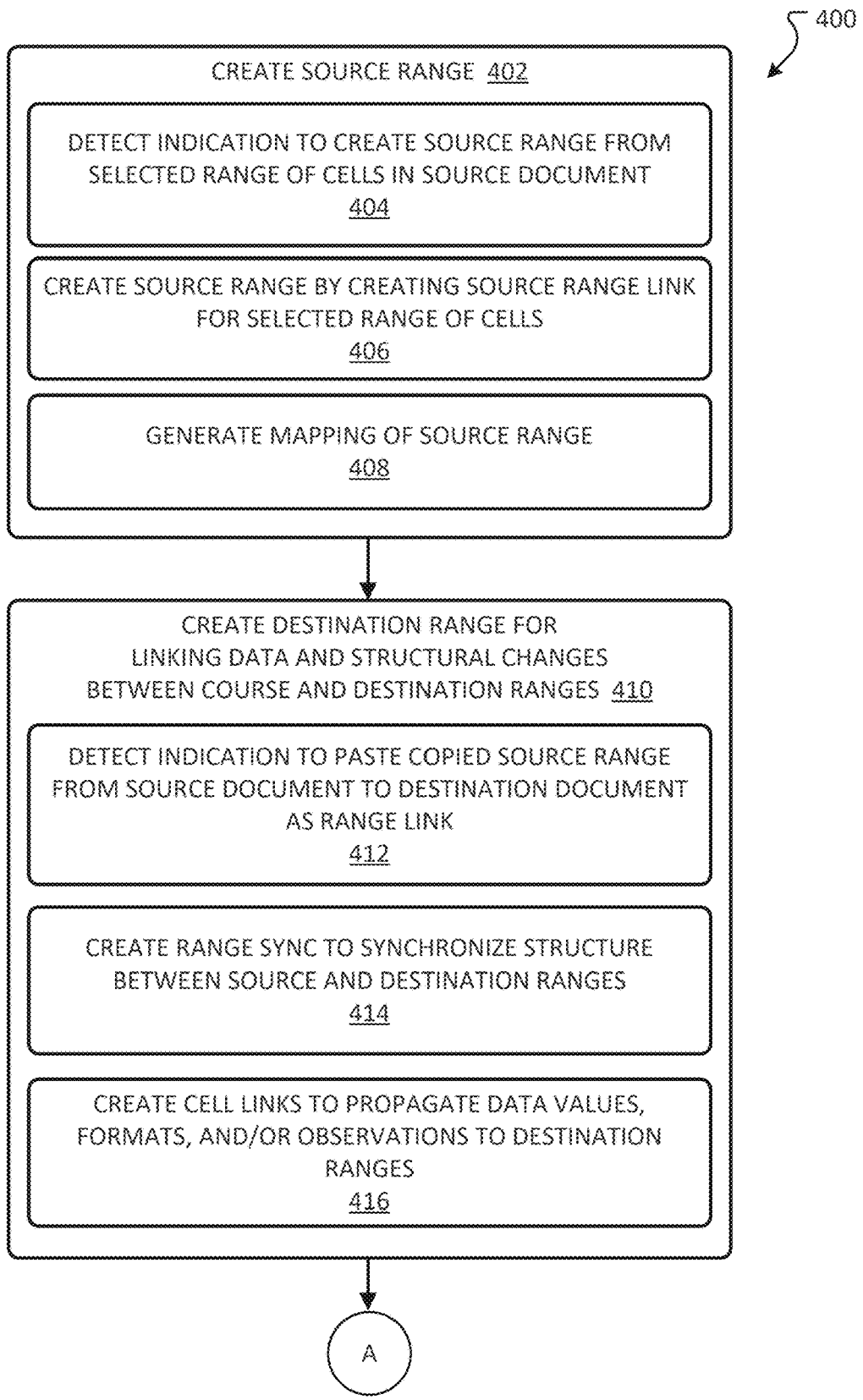
FIGS. 4A-4C is a flowchart illustrating an example method, implemented on a server, for establishing a range link between source and destination ranges, according to an embodiment.
Figure 4B:
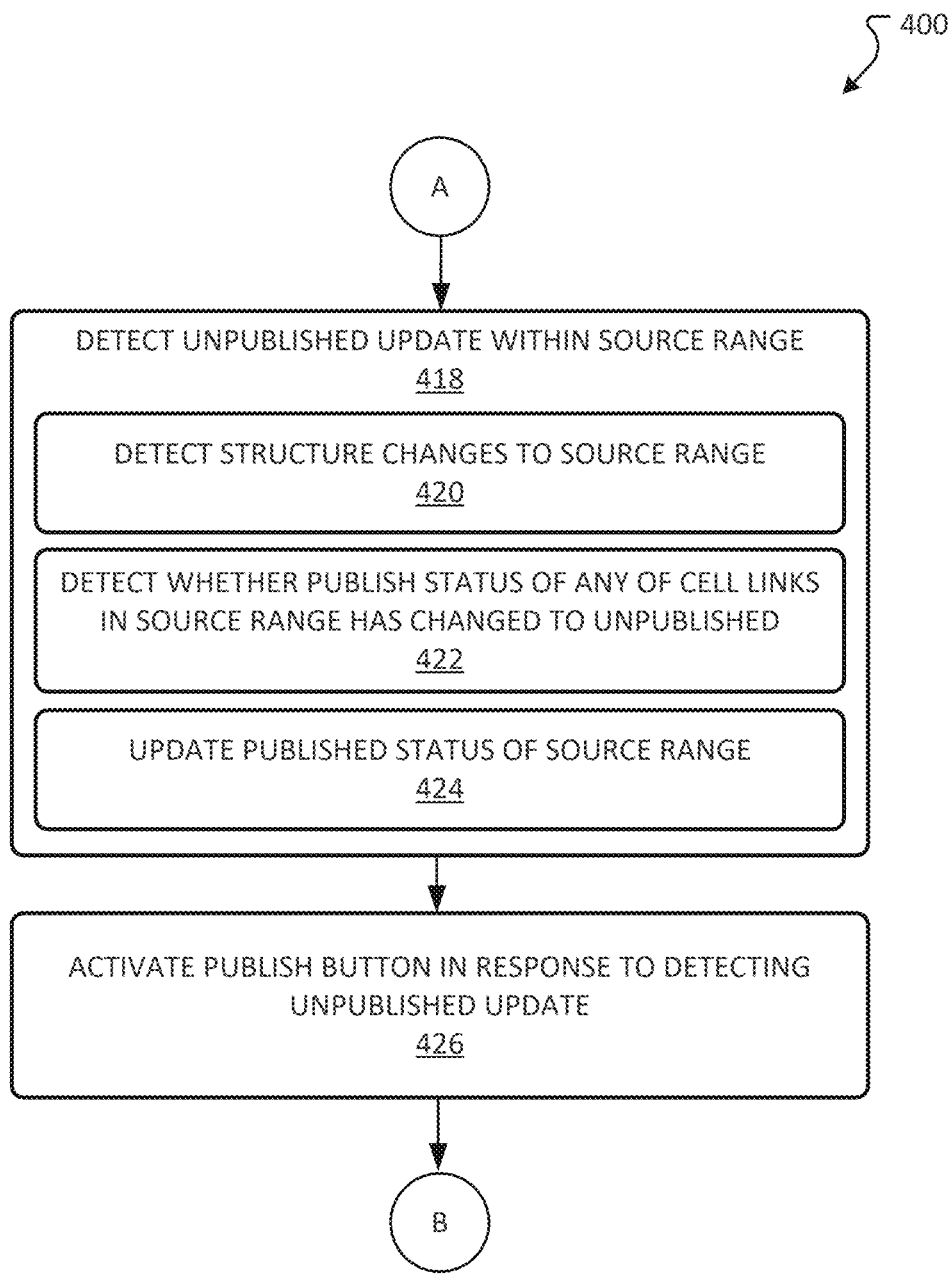
Figure 4C:
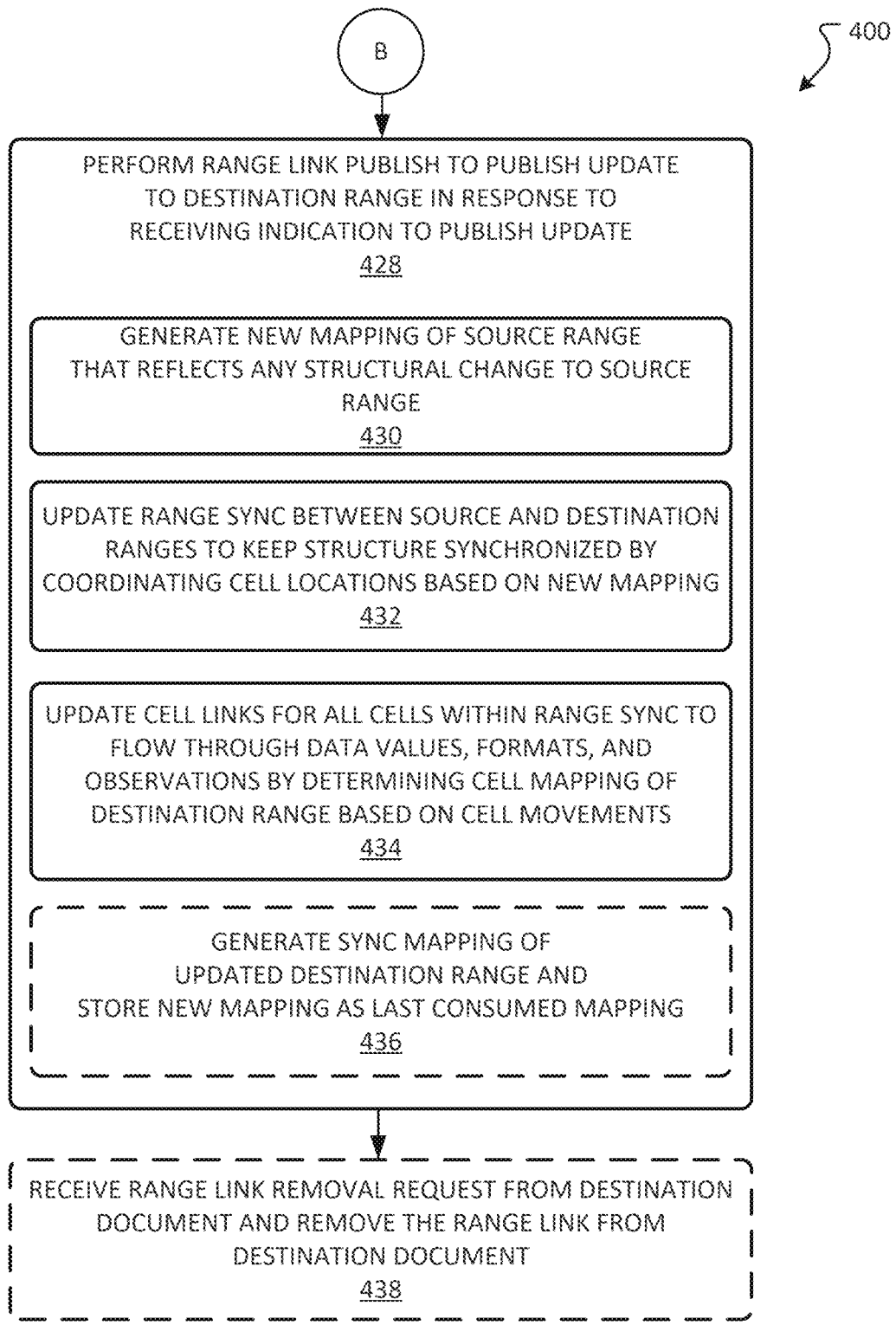

FIGS. 4A and 4B are a flowchart illustrating an example method 400, implanted on a server, for creating source and destination ranges, according to an embodiment. In some examples, the method 400 is implemented by the productivity server 100 of FIG. 1, which interacts with the database server 106 and the client devices 104. FIG. 4 is described with reference to FIG. 1 for explanatory purposes. In other embodiments, however, the method 400 is implemented by another suitable computing device. In some examples, steps of the process 400 may be omitted or additional steps may be added.

At block 402, a source range is created. To do so, an indication or request to create a source range from a selected range of cells (e.g., a table) in a source document is detected, as indicated in block 404. For example, the source document may be a spreadsheet, an embedded table, or a chart table. Subsequently, a source range is created by creating a source range link for a selected range of cells and creating a structure sync wrapped around the selected range of cells, as indicated in block 406. It should be appreciated that, in some embodiments, an existing source range may be deleted by removing the source range link. Additionally, a mapping of the source range is generated, as indicated in block 408. For example, the mapping of the source range maps universally unique identifiers (UUIDs) of the cells to corresponding locations of the respective cells. Once the source range is created, an indication or request to select or copy the source range may be detected.

At block 410, a destination range is created for linking data and structural changes between source and destination ranges. As described above, linking the source and destination ranges includes synchronizing structure modifications from the source range to the destination range and creating cell links between the source range cells and the destination range cells to flow through cell values, formats, and/or metadata (e.g., comments, attachments, XBRL). To do so, an indication or request to insert the selected or copied source range from the source document to a destination document as a range link is detected, as illustrated in block 412. For example, the destination document may be a spreadsheet, an embedded table, or a chart table.

In response, a range sync is created to synchronize the table structure between the source and destination ranges, as illustrated in block 414. This allows the users to push or publish a table structure or any structural modifications from the source document to the destination document rather than pulling from the destination document. In other words, the range sync between the source and destination ranges coordinates cell locations between synchronized ranges at the time of publish, such that all source range cell locations, including any structural change to the source range (e.g., insert, sort, drag, drop, etc.), are mirrored by the corresponding destination range cell locations.

Additionally, as indicated in block 416, cell links are created to propagate cell characteristics (e.g., data values, formats, and metadata) of the cells in the source range to the destination range. In other words, each cell within a linked range has an individual cell link. The cell links between the cells (e.g., point-to-point linking) in the source and destination ranges allows the cell characteristics to flow through from the source range.

It should be appreciated that, in some embodiments, the cell links may exist prior to creating a range link between the source and destination ranges. For example, a user may select a table from a source document and insert it in a destination document and create cell links between the cells within the tables. In such embodiments, changes in data values in the source table are pushed to the destination table, such that the data values of the tables are synchronized. However, since only cells are linked to each other, any structural changes (e.g., adding or removing rows/column) to the source table are not pushed to the destination table. As such, the user would need to manually replicate each structural change to the source table in the destination table, which is a time-consuming and error-prone process. To push the structural changes, the user may choose to create a range link between the source table and the destination table, thereby establishing a range sync between the ranges of cells in the source and destination tables. In such embodiments, the existing cell links between the cells in the source and destination tables are utilized to link the cells (e.g., to flow through data values, formats, and metadata) and new cell links need not be created, unless new cells are added within the range link via structural modification (e.g., row or column insertion).

Once the destination range is created and the range link is established between the source and destination ranges, the method 400 advances to block 418 in FIG. 4B.

At block 418, the source range is monitored to detect any unpublished update within the source range. To do so, the source range is monitored to detect any structural changes to the source range and any unpublished cell links within the source range, as indicated in block 420. Additionally, the source range is monitored to detect whether a publish status of any of the cell links in the source range has changed to unpublished (e.g., due to any changes to cell-level data values, formats, and/or metadata), as indicated in block 422. Based on the detection, a published status of the source range is updated to indicate whether the changes to the source range (e.g., structural modifications to the source range and/or unpublished cell links) have been published to the destination range, as indicated in block 424. In other words, detection of a structural modification to the source range and/or an unpublished cell link within the source range will cause the source range to become unpublished. In some embodiments, source cells may be denoted with a published identifier to show the published status.

For example, as described above in FIG. 3, the source range link indicator 312 outlines a range of cells in the source range 310 and indicates the publish status of the source range link, and the cell link indicator 314 indicates the publish status of the respective cell. In the illustrative embodiment, the cell link indicator 314 is color-coded to illustrate the published status of the respective cell. For example, the blue range indicator may be used to indicate that the respective cell is published (e.g., no unpublished changes to cell-level data values, formats, and/or observations metadata associated with the respective cell), and the orange range indicator may be used to indicate that the respective cell includes an unpublished update (e.g., an unpublished changes to cell-level data values, formats, and/or observations metadata associated with the respective cell). The source range link indicator 312 changes to the unpublished status if a structural change to the source range is detected and/or if any cell link indicator (e.g., 314) becomes unpublished. It should be appreciated that if the status of the source range link indicator 312 becomes unpublished due to the detection of a structural change to the source range, the statuses of the cell link indicators 314 of the cells in the source range will remain the same (i.e., none of the cell link indicators 314 will show as unpublished). In other words, the source range link indicator 312 is used to indicate whether the range has been structurally modified (e.g., cells have been moved, removed, or added). Additionally, the source range link indicator 312 is also used to indicate whether any cells within the source range 310 have become unpublished, and the cell link indicators 314 are used to indicate the state of any particular linked cell within the source range 310.

At block 426, once an unpublished update is detected in the source range, a publish button (e.g., 616) is activated. The active publish button allows users to publish the new changes in the source range to the destination range. For example, as illustrated in FIG. 6B, the publish button may change color (e.g., turn green), indicating that the publish button has been activated.

At block 428, a range link publish is performed to publish the update to destination range in response to receiving an indication to publish the update via the published button. To do so, a new mapping of the source range that reflects any structural changes to the source range is generated, as indicated in block 430. The new mapping of the source range is then provided to the destination range or is otherwise available for the destination range to access to update the range link between the source and destination ranges.

Subsequently, the range sync is updated between the source and destination ranges to keep the structure synchronized by coordinating cell locations based on the new mapping, as indicated in block 432.

Additionally, at block 434, cell links are created or updated for all cells within the range sync to flow through data values, formats, and/or metadata by determining the cell mapping of the destination range based on the cell movements determined in block 432. In other words, all cells in the source range are re-linked to the corresponding locations in the destination range.

Subsequently, in some embodiments, a sync mapping of the updated destination range may be generated, and the new mapping of the source range may be stored as the last consumed mapping, as indicated in block 436. It should be appreciated that, in some embodiments, the last consumed mapping may be stored with the source document or the destination document. In other words, updating the range link may be performed by moving cells from old locations to new locations in the destination document according to the new mapping instead of overwriting them in place. By moving cells in accordance with the new mapping, it allows the destination range to accurately keep track of cell history of previous cell moves within the linked range. For example, the cell history may include knowledge of how a particular cell's value and format are changed over time. However, it should be appreciated that the cells in the destination range are able to track accurate cell history over time and move any destination-side formatting or observations appropriately. This ensures destination cells that have been formatted by users retain the formatting and history even when moved by the range link.

In some embodiments, a range link removal request may be received from the destination document, as indicated in block 438. For example, a user may want to remove the range link between the source and destination ranges, such that the destination range stays independent of the source range. In some embodiments, there may be multiple destination ranges created in multiple destination documents that are linked to the same source range, and the user may choose to remove the range link for a particular destination range.

It should be appreciated that removing the range link from the destination range does not delete the cells within the now removed destination range from the destination document. As described above, the destination range that is linked to the source range is protected from any structural modification (e.g., row/column insertions or removals, individual cell link removals, and/or an expansion of the table outside of the destination range) to the destination range, such that users cannot manually modify the structure of the destination range or remove cells or links within the destination range. However, once the range link is removed from the destination range, changes made to the source range will no longer be published to the destination document and the users can make any structural modification to the structure of the destination range in the destination document.

FIGS. 5A-5E are screenshots of an example user interface for establishing a range link between a source range 520 and a destination range 522, according to an embodiment. The user interface may be provided by the computing device of FIG. 2, one or more of the computing devices 104, or other suitable devices, in various examples. In the embodiment shown in FIG. 5A-5E, the user interface may correspond to the client software 105 and display a source or destination document 510, 512 (or a portion thereof). The source and destination documents 510, 512 may be any suitable electronic document, for example, a spreadsheet document, text or text-based document (e.g., contract or legal document, source code, essay, HTML, script, etc.), presentation document, or other suitable document types.

Figure 5A:
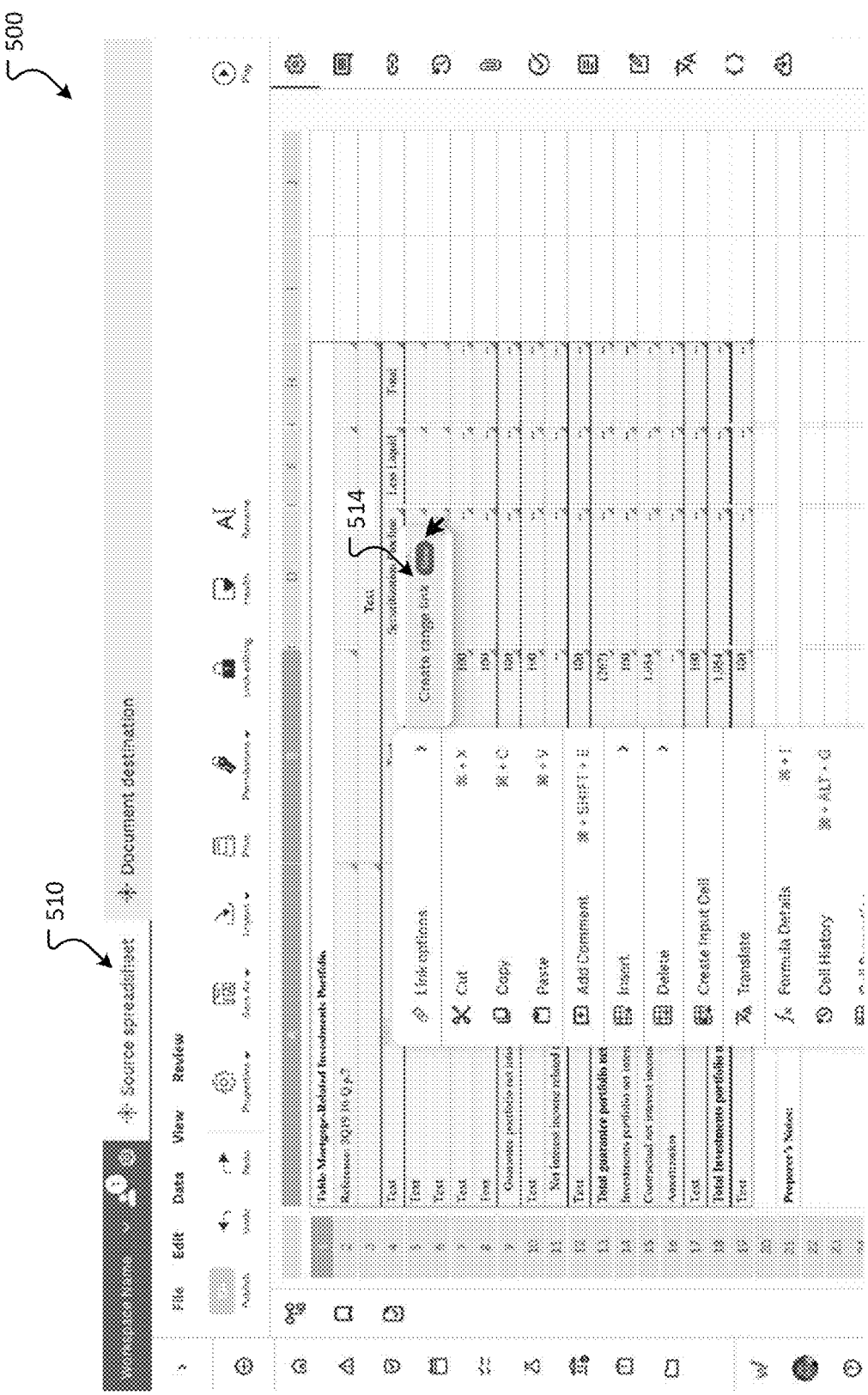
FIGS. 5A-5E are screenshots of an example user interface for establishing a range link between source range and destination ranges, according to an embodiment.
Figure 5B:
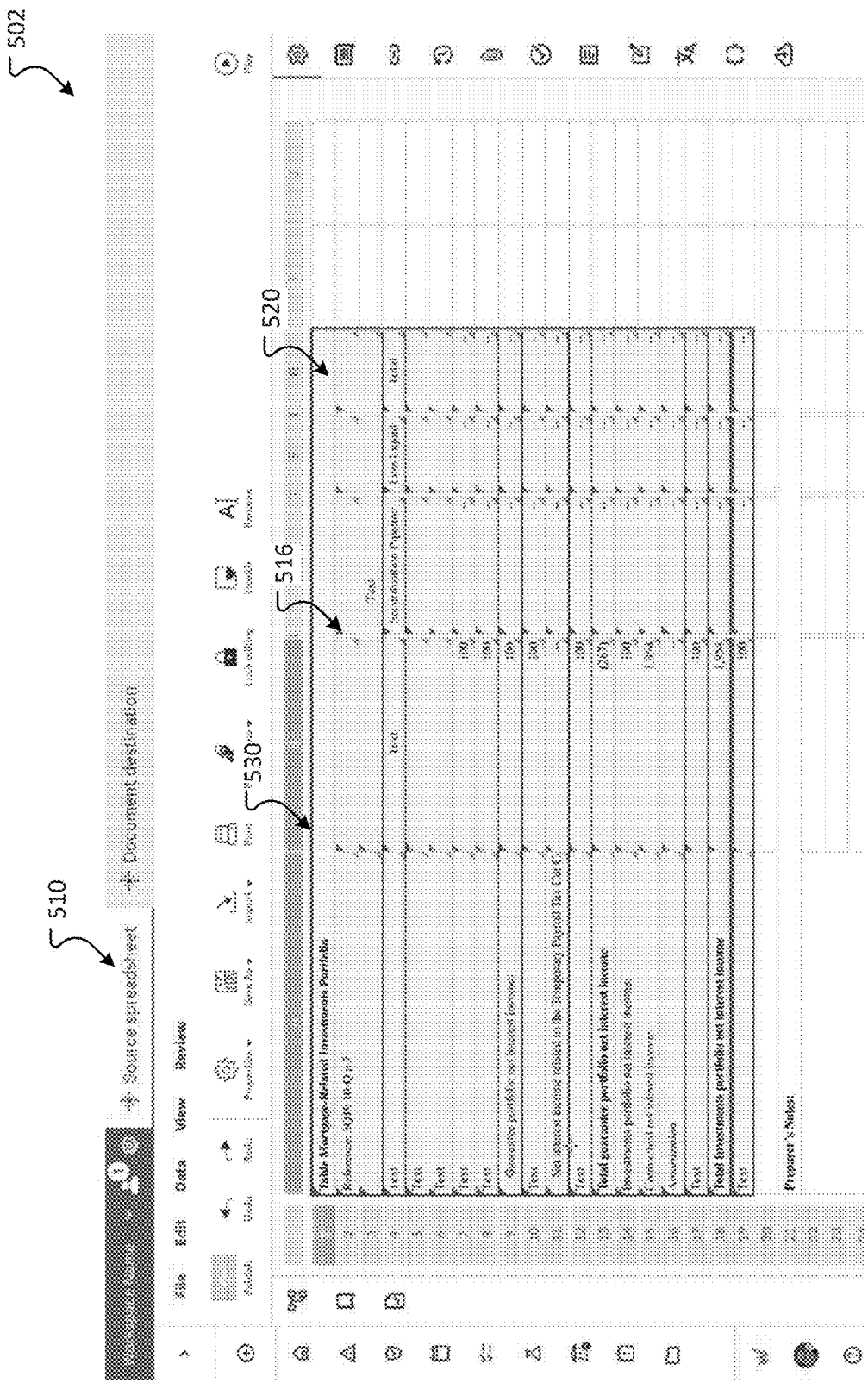

In the example shown in FIGS. 5A and 5B, screenshots of an example user interface of a source spreadsheet 510 for creating a source range 520 in the source spreadsheet 510 are provided. For example, a user may select a range of cells in the source spreadsheet 510 and select a "Create range link" option 514 to create a range link for the selected range of cells, as illustrated in a screenshot 500 in FIG. 5A.

Once the user selects the "Create range link" option 514, the source range 520 is created, as illustrated in a screenshot 502 in FIG. 5B. A range of cells in the source range 520 is outlined with a range indicator 530. Additionally, each cell in the source range 520 is marked with a cell link indicator 516. The presence of the cell link indicator 516 within the source range 520 indicates that the range link is created for the source range 520 and each cell within the source range 520 has an individual cell link. A different color coding may be used to denote the range link state. It should be appreciated that the range indicator 530 is similar to the source range indicator 312, and the cell link indicator 516 is similar to the cell link indicator 314 in FIG. 3.

Figure 5C:
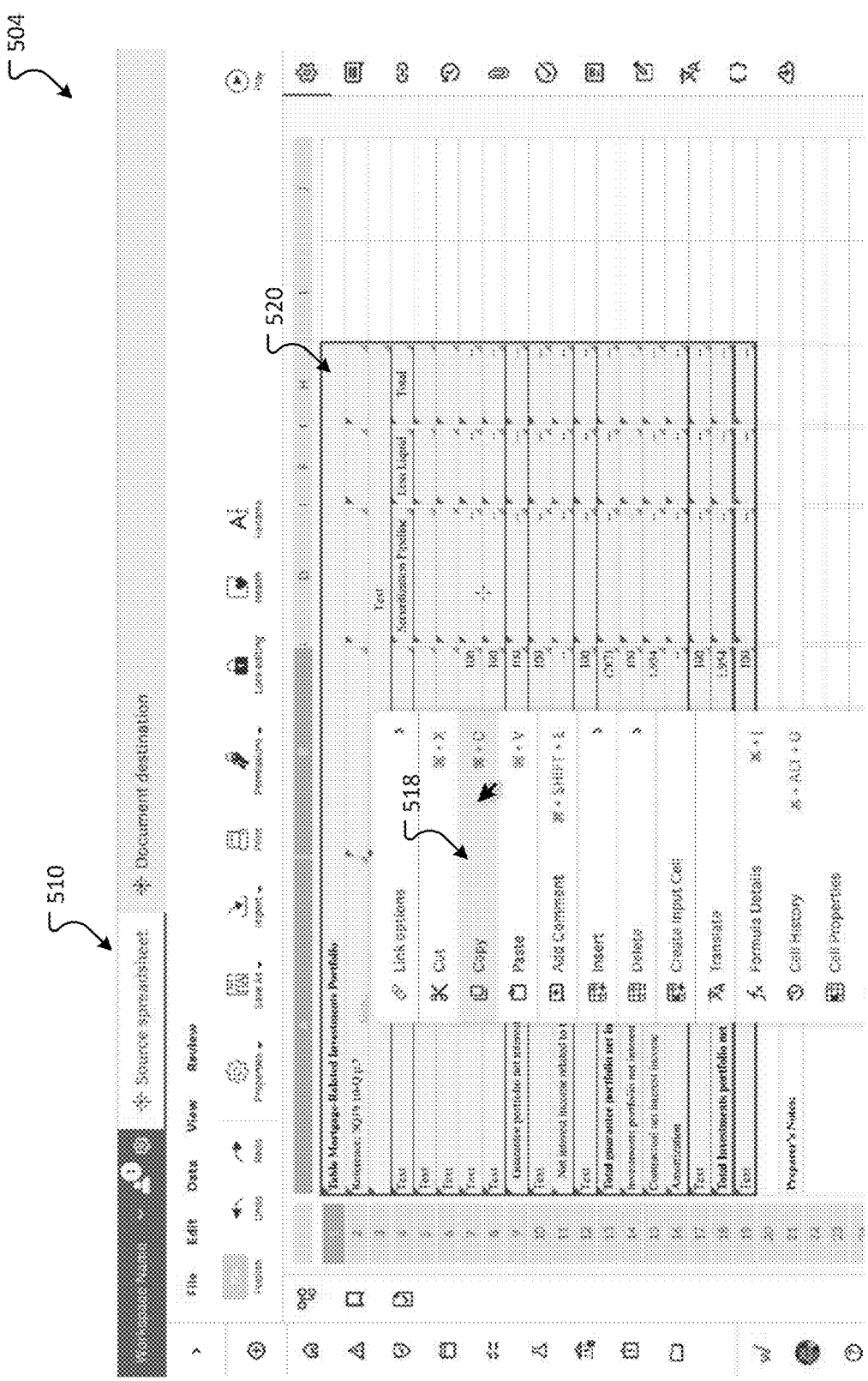

Once the source range 520 is created, a user may copy the source range 520 using a "Copy" button 518, as illustrated in a screenshot 504 in FIG. 5C. In some embodiments, a keyboard shortcut or a voice command may be used to copy the source range 520.

Figure 5D:
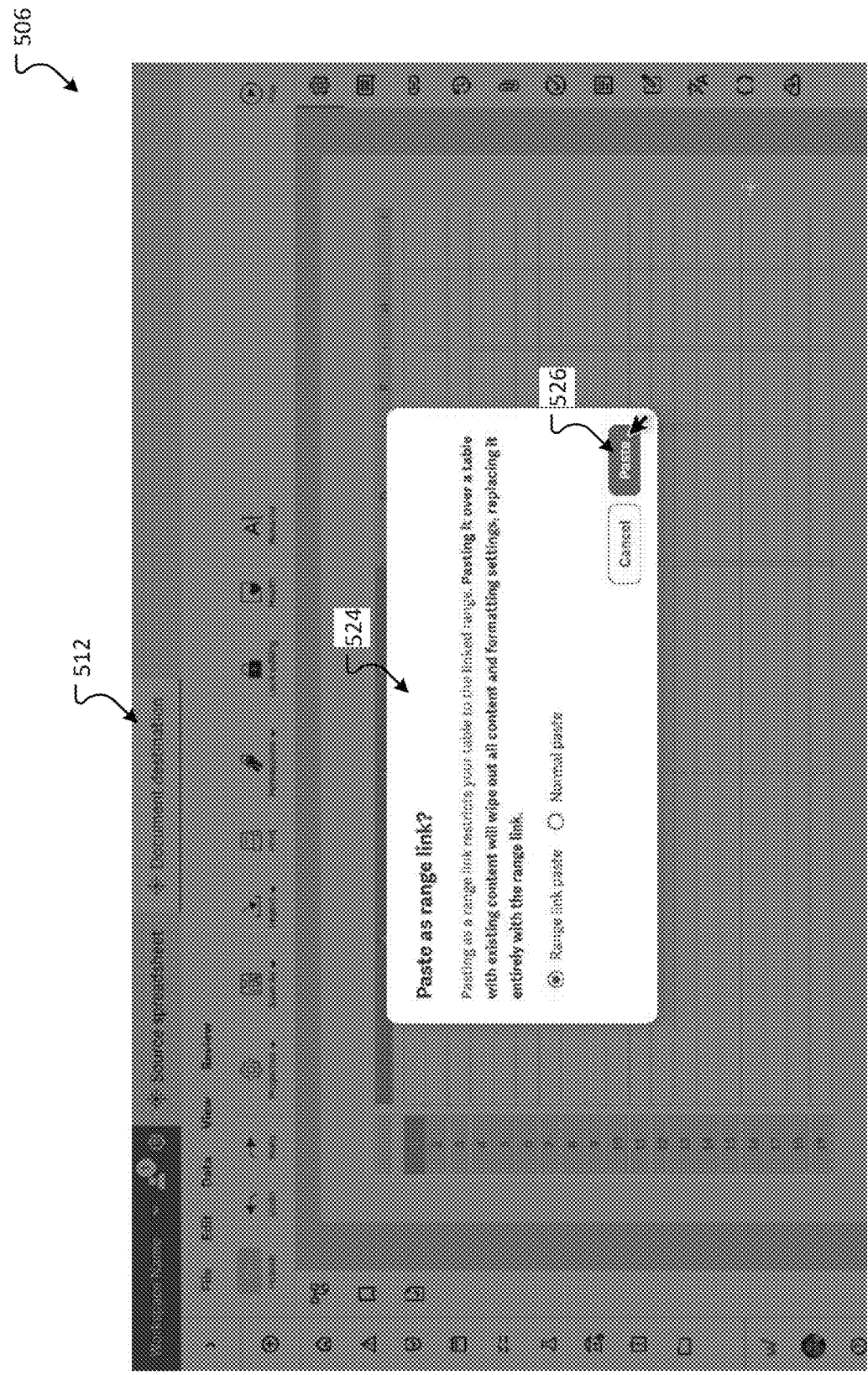
Figure 5E:
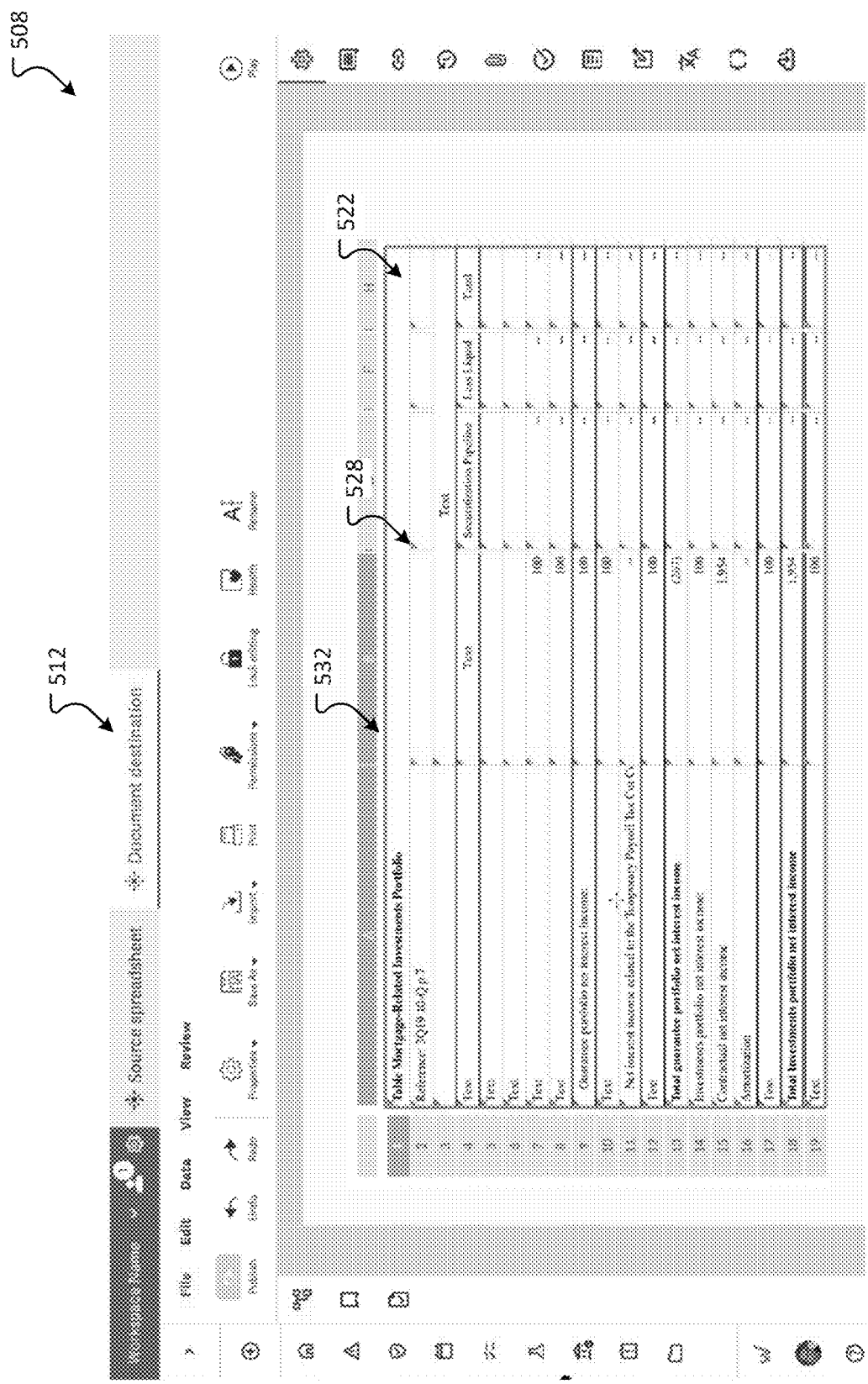

When the user pastes the copied source range 520 to a destination spreadsheet 512, a notification window 524 pops up indicating whether to paste it as range link, as illustrated in a screenshot 506 in FIG. 5D. In response to the user confirming the "Range link paste" option using a Paste button 526 of the notification window 524, the destination range 522 is created, as illustrated in a screenshot 508 in FIG. 5E.

A range of cells in the destination range 522 is outlined with a range indicator 532. Additionally, each cell in the destination range 522 is marked with a cell link indicator 528. The presence of the range link indicator 532 within the destination range 522 indicates that the range link is established for managing links within the source and destination ranges 520, 522, such that any changes in structure and/or value in the source range 520 are propagated to the linked destination range 522. A different color coding may be used to denote the range link state. It should be appreciated that the range indicator 532 is similar to the destination range link indicator 322, and the cell link indicator 528 is similar to the cell link indicator 324 in FIG. 3.

FIGS. 6A-6D are screenshots of an example user interface for synchronizing a range link between source and destination ranges, according to an embodiment. The user interface may be provided by the computing device of FIG. 2, one or more of the computing devices 104, or other suitable devices, in various examples. In the embodiment shown in FIG. 6A-6D, the user interface may correspond to the client software 105 and display a source or destination document 510, 512 (or a portion thereof). The source and destination documents 510, 512 may be any suitable electronic document, for example, a spreadsheet document, text or text-based document (e.g., contract or legal document, source code, essay, HTML, script, etc.), presentation document, or other suitable document types.

Figure 6A:
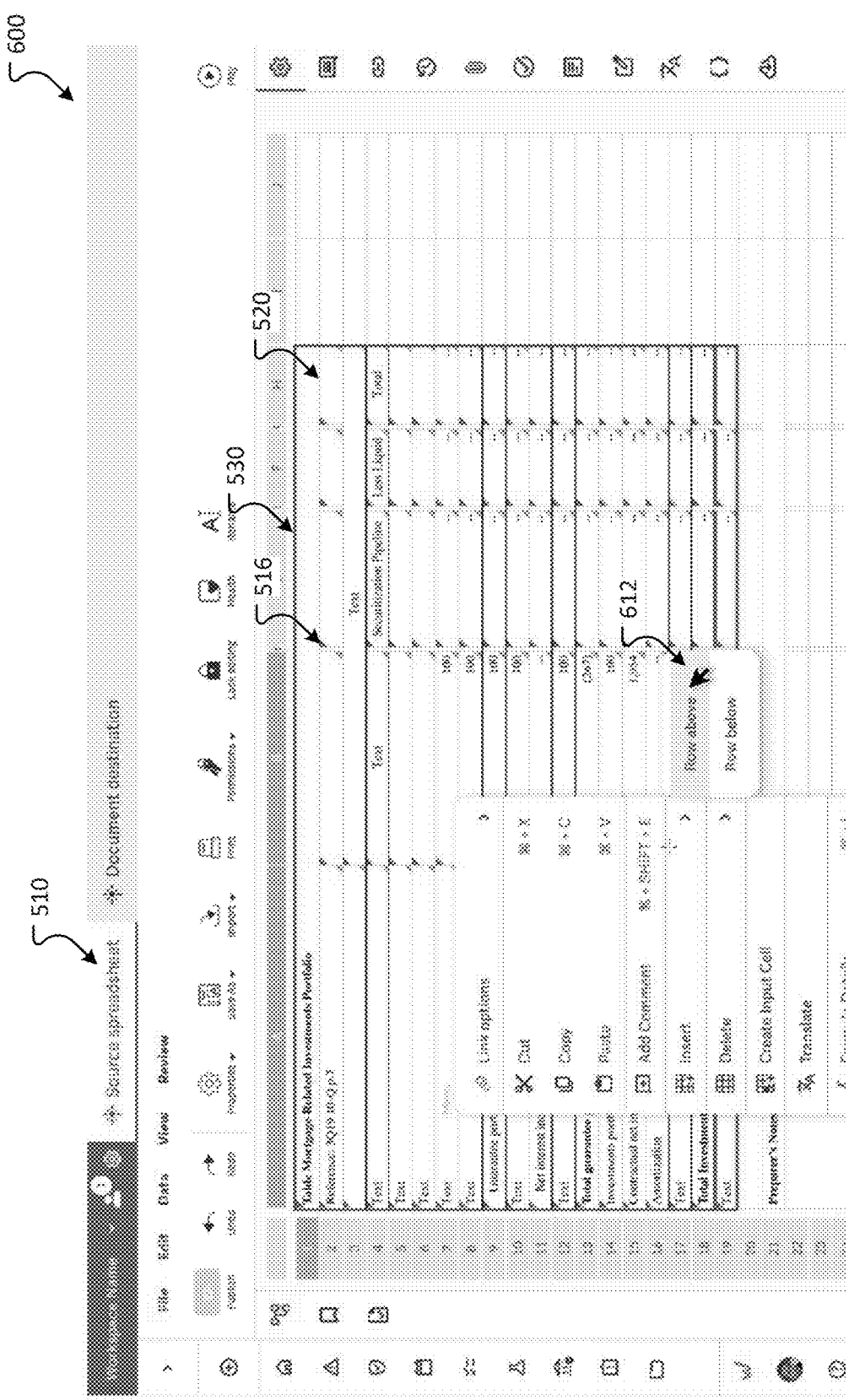
FIGS. 6A-6D are screenshots of an example user interface for synchronizing a range link between source and destination ranges, according to an embodiment.
Figure 6B:
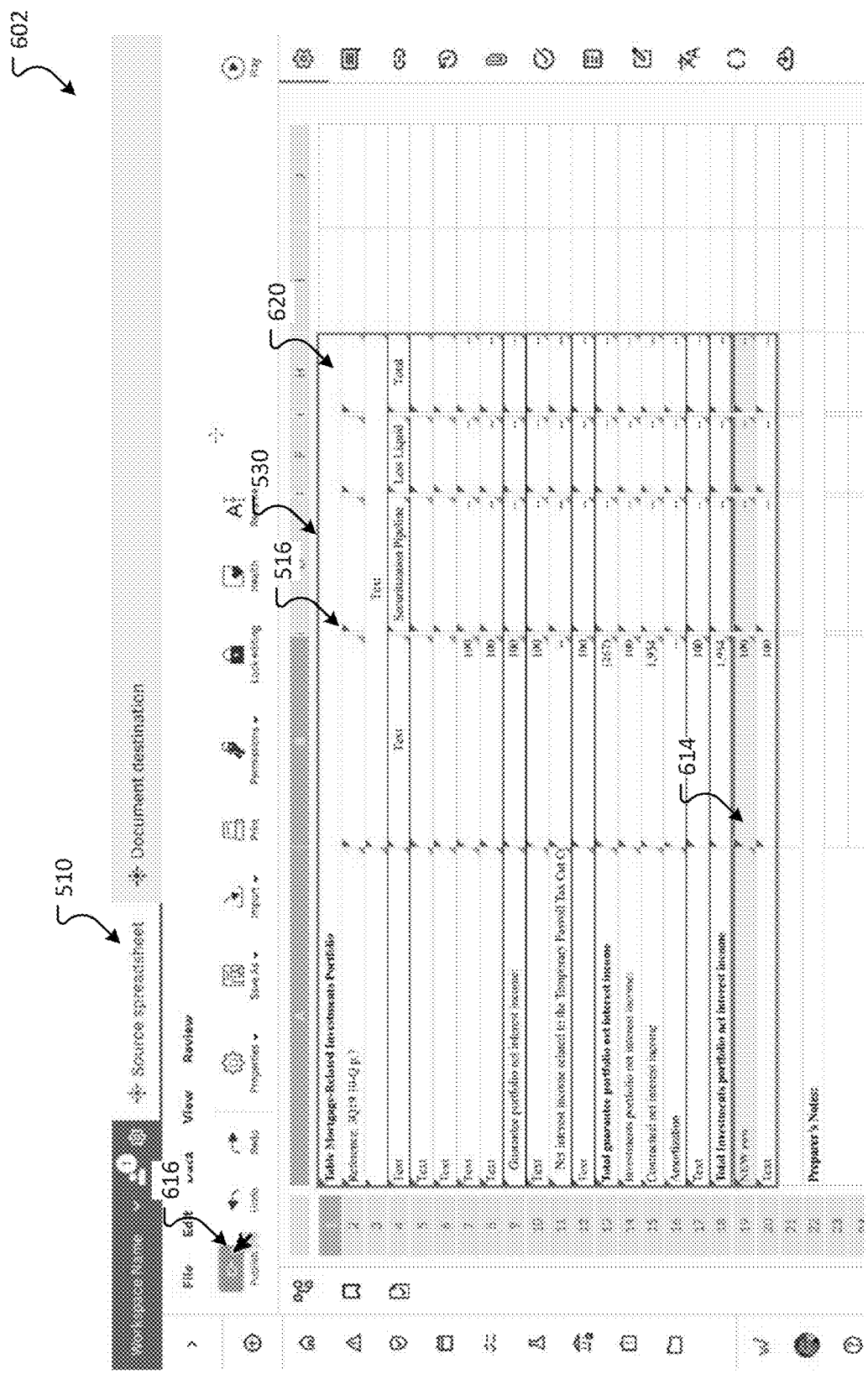

Once the range link is created between the source and destination ranges 520, 522 (e.g., as illustrated in FIGS. 5A-5E), a user may choose to insert a row above Row 19 within the source range 520 by using an insert row above button 612, as illustrated in a screenshot 600 in FIG. 6A. By adding a row to the source range 520, the data range of the source range 520 changes from A1:H19 to A1:H20. In some embodiments, a user may change the data range of the source range 520 by manually entering the data range. For example, if the user indicates the data range to be changed from A1:H19 to A1:H20, a new row of H20 will be added to the source range 520.

Any changes to the source range 520 are detected as unpublished updates. As described above, the range indicator 530 outlines a range of cells in the source range 520. The range indicator 530 may be color-coded to illustrate the published status of the source range 520. For example, the blue range indicator 530 may be used to indicate that the source range is published (e.g., no unpublished update within the source range), and the orange range indicator 530 may be used to indicate that the source range includes an unpublished update (e.g., an unpublished update has been detected within the source range).

In response, a new Row 19 614 is created and the new data range of the updated source range 620 becomes A1:H20, as illustrated in a screenshot 602 in FIG. 6B. As illustrated in the screenshot 602, the row 614 is highlighted to indicate a new row, and the range indicator 530 turns color (e.g., from blue to orange) to indicate the presence of an unpublished update. Once the unpublished update is detected, a Publish button 616 is activated (e.g., turns green) to allow the user to push the unpublished update to the destination range 522.

Additionally, the range indicator and the cell link indicator 516 may be used to illustrate the published status. The range indicator 530 indicates a range link state (e.g., whether the range link is created for the source range and each cell within the source range has an individual cell link). The cell link indicator 516 further indicates whether the respective cell has been published to the destination range. In other words, the cell link indicator 516 is used to indicate whether the respective cell includes any cell-level changes that have not been published to the destination range. For example, if a cell-level change is detected, the cell link indicator 516 of the respective cell changes from a blue triangle indicator to an orange triangle indicator.

Figure 6C:
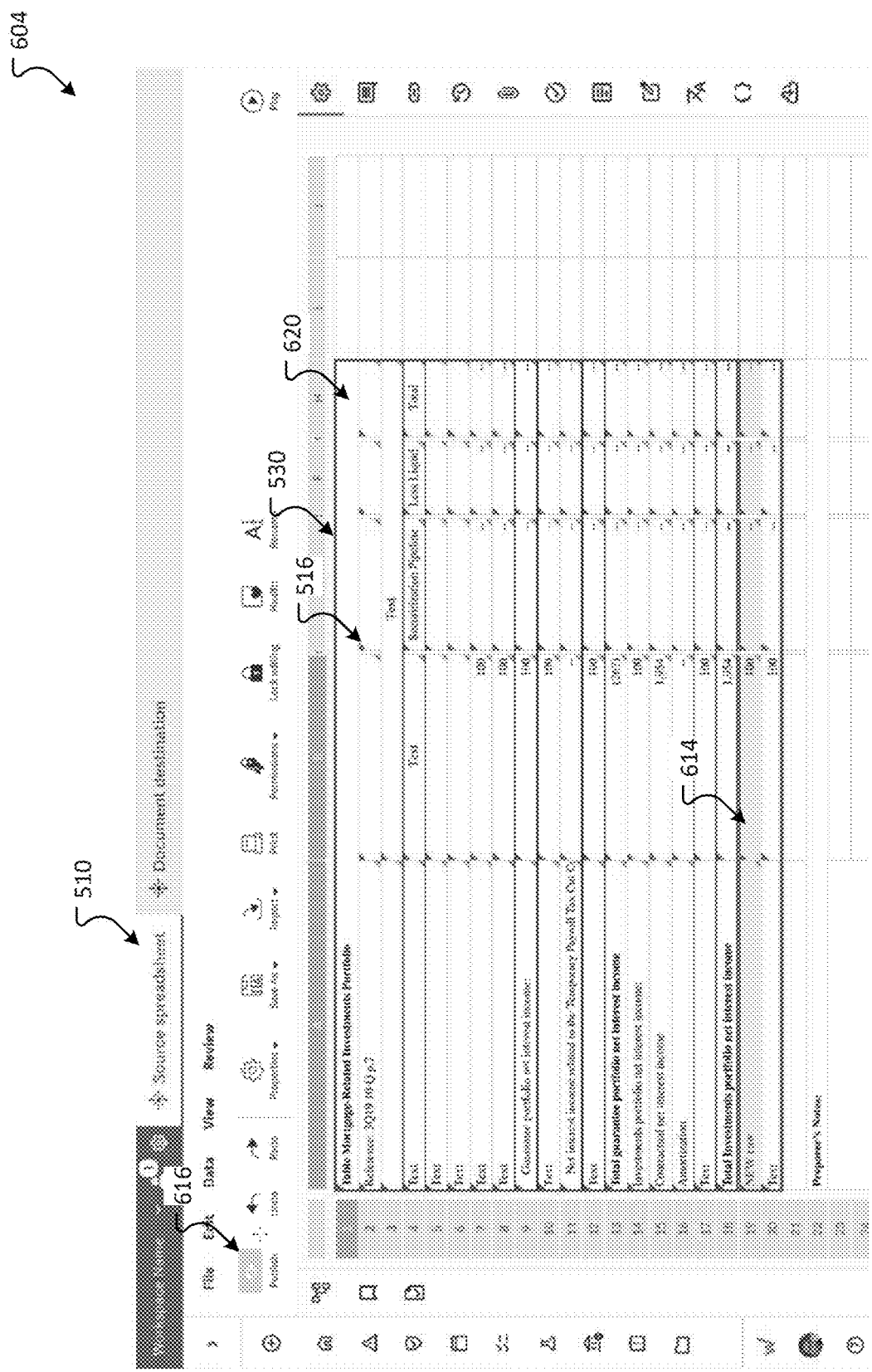

In response to determining that the unpublished updates have been pushed to the previously linked destination range 522, the Publish button 616 becomes inactive (e.g., turns grey) and the range indicator 530 and the cell link indicator 516 are updated to reflect that the publish status, as illustrated in a screenshot 604 in FIG. 6C. For example, the range indicator 530 may change from orange to blue, and the cell link indicators 516 are changed from orange triangles to blue triangles.

Figure 6D:
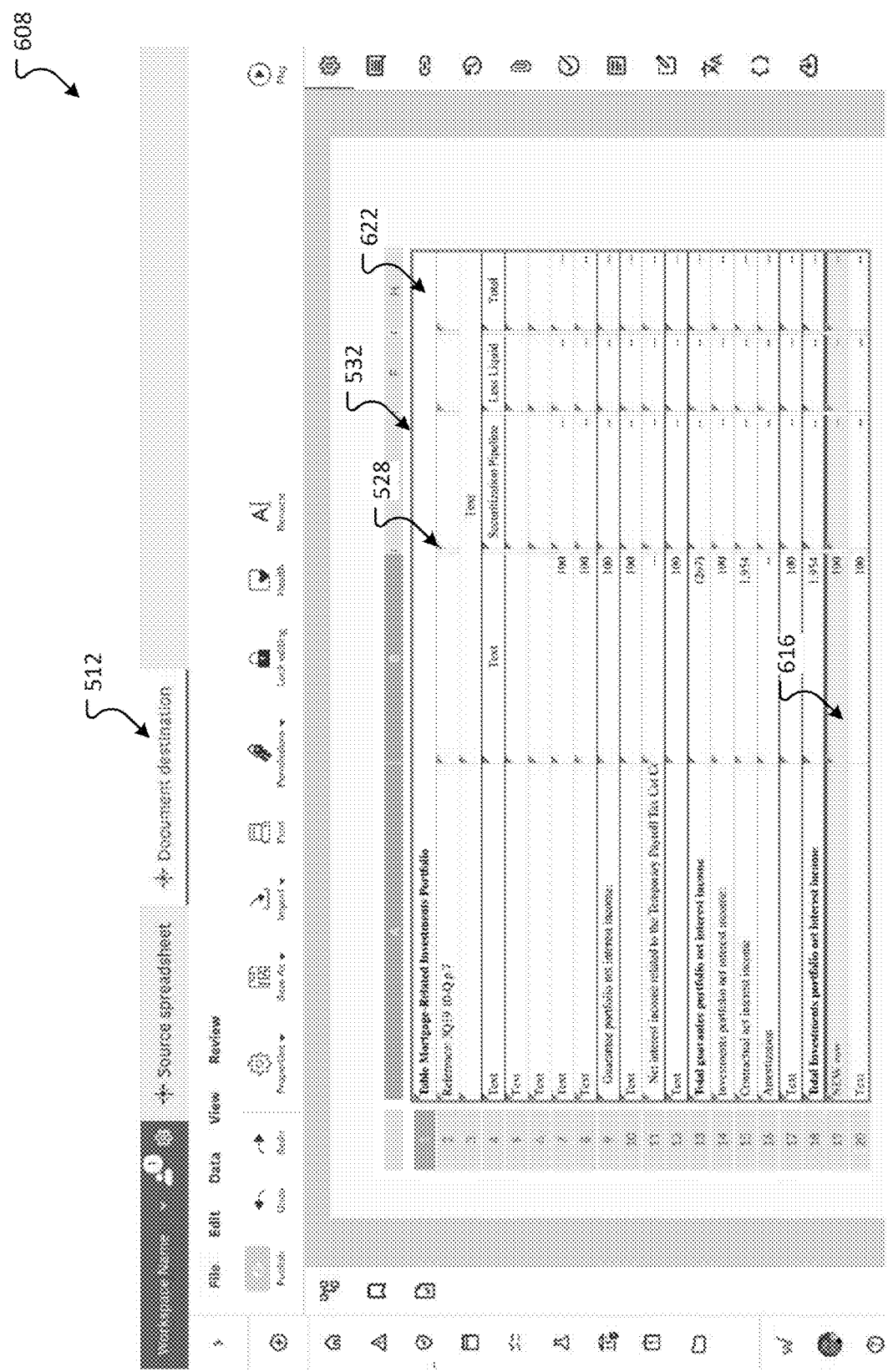

When the updated source range 620 is published to the previously linked destination range 522, the destination range 522 is synchronized with the updated source range 620 and reflects any changes made to the updated source range 620 (e.g., the new data range for the updated destination range 622 becomes A1:H20), as illustrated in a screenshot 608 in FIG. 6D. More specifically, the range sync is updated between the source and destination ranges to keep the structure in synchronized and coordinate cell locations based on the new mapping. Additionally, cell links are created for all cells within the range sync to flow through data values, formats, and/or metadata by determining the cell mapping of the updated destination range 622 based on the cell movements. In other words, all cells in the updated source range 620 are re-linked to the corresponding locations in the updated destination range 622.

FIGS. 7A-7I are flow diagrams of an example process for synchronizing a range link between source and destination ranges, according to an embodiment.

Figure 7A:
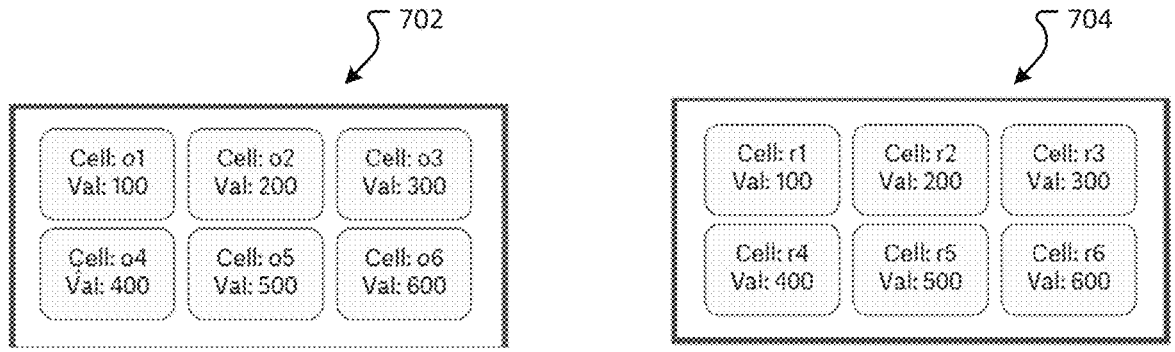
FIGS. 7A-7I are flow diagrams of an example process for synchronizing a range link between source and destination ranges, according to an embodiment.

FIG. 7A illustrates a synchronized range link between a source range and a destination range, such that cell locations and other characteristics (e.g., data values, formats, and metadata) of a range of cells of the source range are replicated at the destination range. Each cell shows its corresponding universally unique identifier (UUID) (denoted as "Cell:") and its value (denoted as "Val:"). It should be appreciated that the UUID of the cell is a unique identifier of the cell and is not a value or location.

For example, the source range 702 has two rows and three columns, and a mapping between the location of the cell and the UUID of the cell is created (e.g., A1-o1, A2-o4, B1-o2, B2-o5, C1-o3, C2-o6). The synchronized destination range 704 also has two rows and three columns, and a mapping between the location of the cell and the UUID of the cell is created (e.g., A1-r1, A2-r4, B1-r2, B2-r5, C1-r3, C2-r6).

Figure 7B:
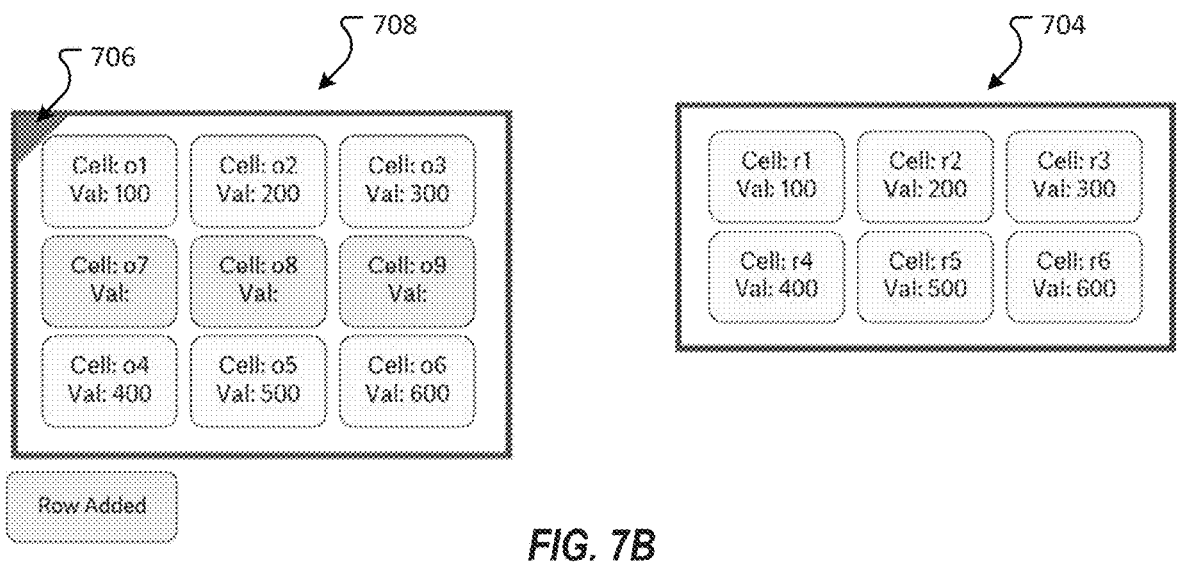
Figure 7C:
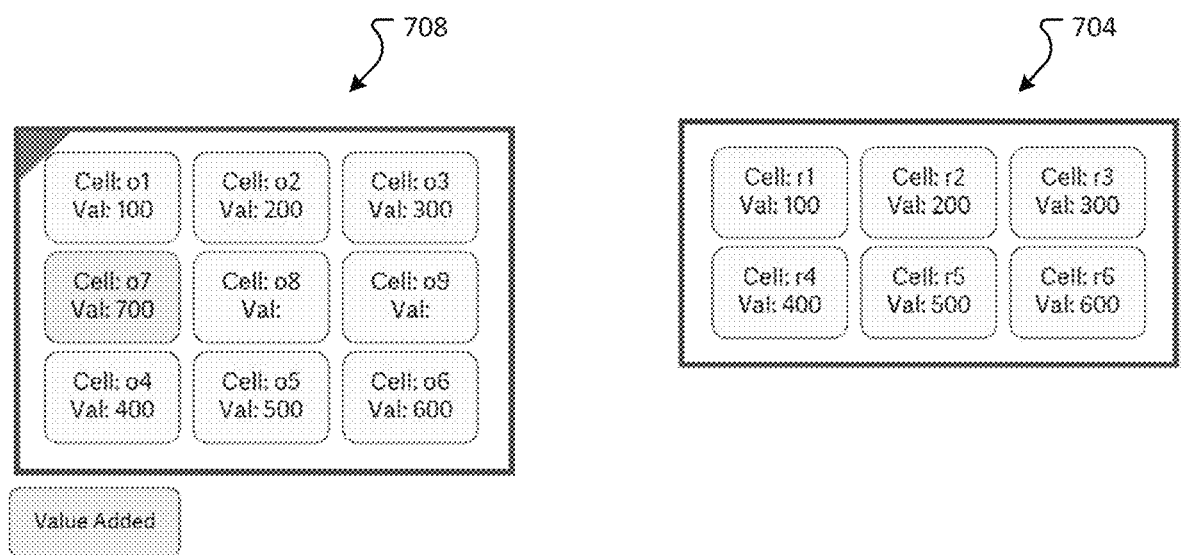
Figure 7D:
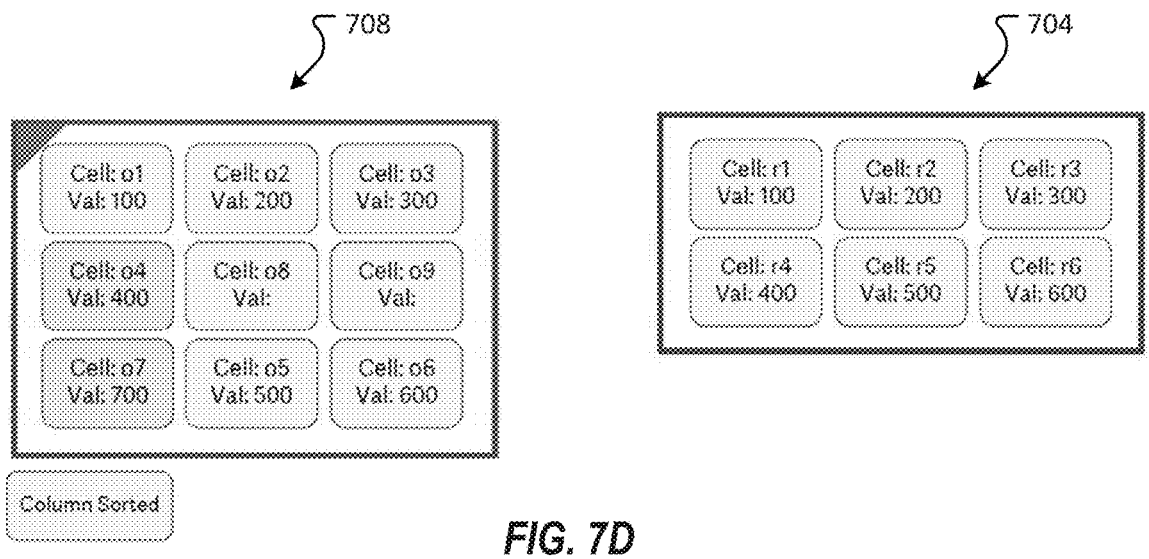
Figure 7E:
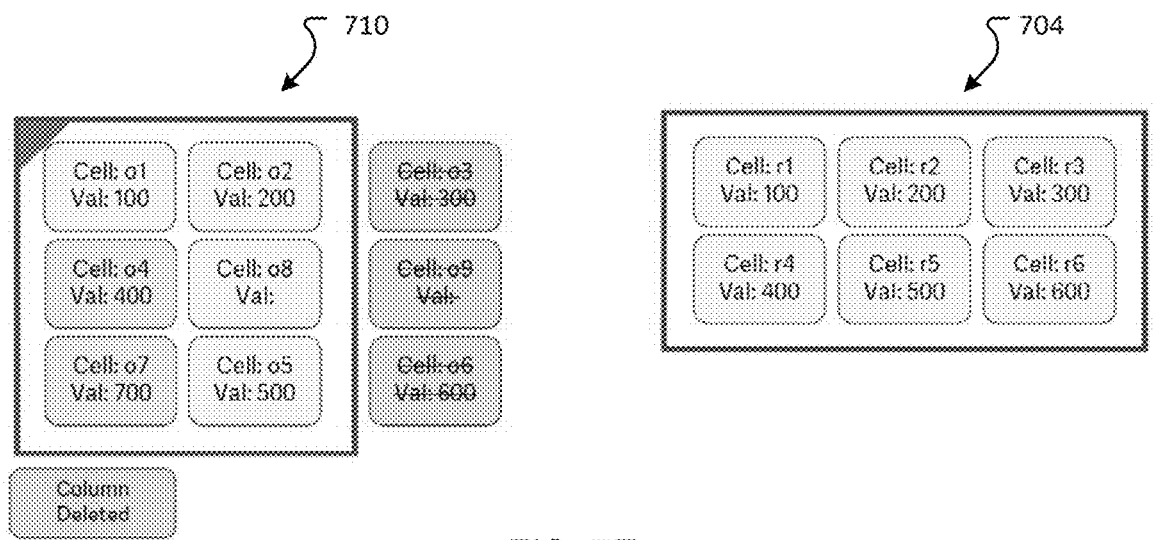

When a user adds a new row to the source range 702 as illustrated in FIG. 7B, new cells o7, o8, and o9 are created. Once the user makes a change to the source range 702, a range link indicator 706 appears to indicate that the updated source range 708 includes unpublished changes. Subsequently, the user may add a value to each cell, as illustrated in FIG. 7C. Additionally, the user may choose to sort a column. As illustrated in FIG. 7D, the first column of the source range 708 is sorted, and cell:o4 is moved to location A2 and cell:o7 is moved to location A3. The user may further delete a column resulting in an updated source range 710, as illustrated in FIG. 7E.

Figure 7F:
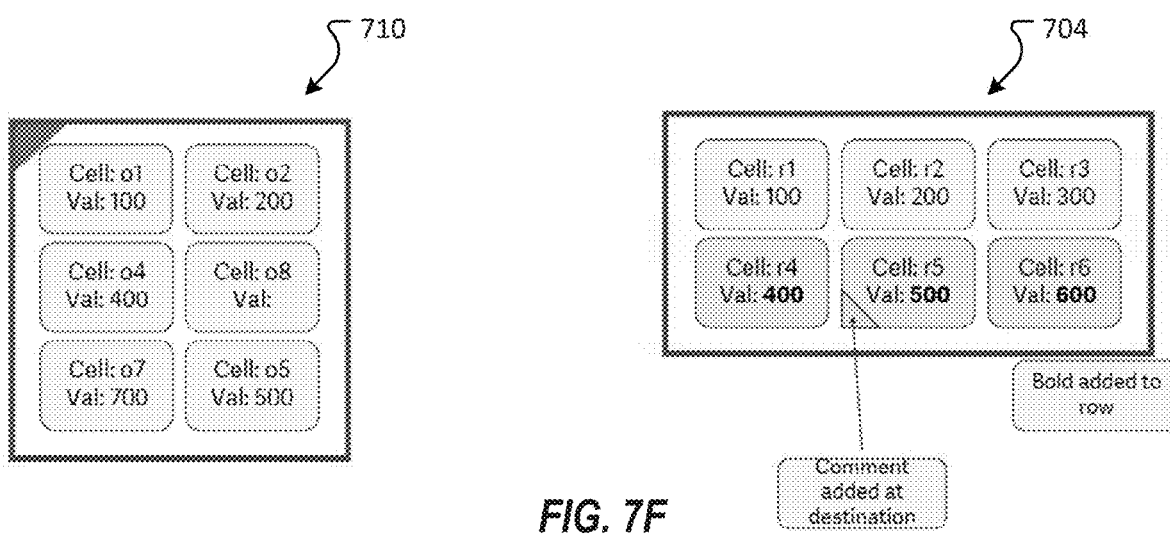

In some embodiments, comments may be added at the destination range and formatting of the data table of the destination range may be changed. For example, as illustrated in FIG. 7F, a user may add a comment to cell:r5 at location B2 and bold values in row2 (i.e., values of cell r4, r5, r6).

Figure 7G:
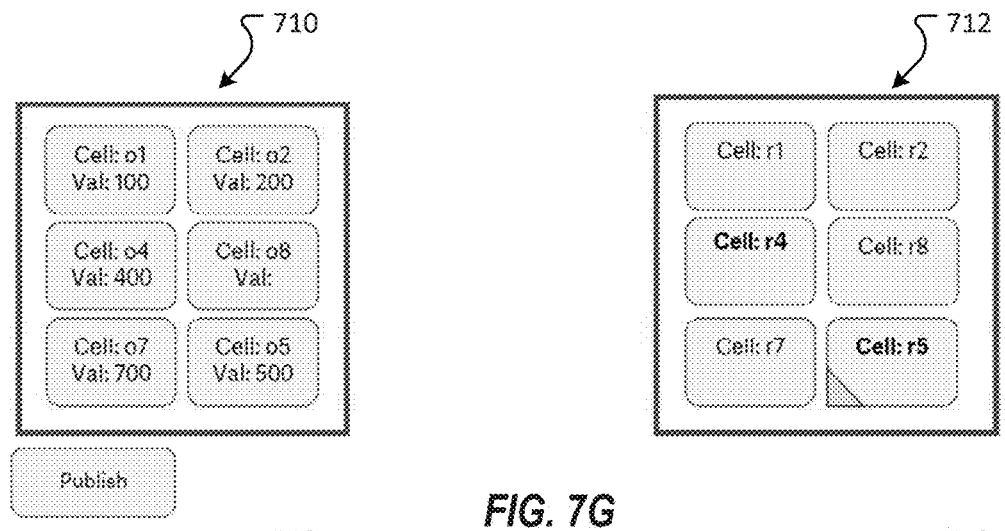

Subsequently, the user may publish unpublished updates of the source range 710 to the destination range 704. In response, a range sync is created between the source and destination ranges to synchronize the table structure, as illustrated in FIG. 7G. The range sync between the source and destination ranges coordinates cell locations between synchronized ranges by replicating any structural change. To do so, all cells of the previously synced destination range 704 are first deleted and then cells that are still in the updated source range 710 are readded at the correct location and new cells are created at the new locations to create an updated destination range 712. It should be appreciated that the cells from the previously synced destination range 704 are added to the updated destination range 712 with any formats and/or metadata that have been made to the corresponding cells. In other words, the formats and metadata associated with the cells in the previously synced destination range 704 are retained for the updated destination range 712.

In order to mirror the cell movements at the updated source range 710, new cell locations of the destination range 712 are determined. For example, the new cell locations at the destination range 712 may be determined based on a new mapping of the source range 710, a previous mapping of the source range 702, and a previous mapping of the destination range 704.

| New Mapping of Source Range | Previous Mapping of Source Range | Previous Mapping of Destination Range | New Mapping of Destination Range |
| --- | --- | --- | --- |
| A1-o1 | o1-A1 | A1-r1 | A1-r1 |
| A2-o4 | o4-A2 | A2-r4 | A2-r4 |
| A3-o7 | o2-B1 | B1-r2 | A3-r7 |
| B1-o2 | o5-B2 | B2-r5 | B1-r2 |
| B2-o8 | o3-C1 | C1-r3 | B2-r8 |
| B3-o5 | o6-C2 | C2-r6 | B3-r5 |

Location A1 maps to cell:o1 of the source range 710, which was previously at location A1 in the source range 702, is cell:r1 in the destination range 712.

Location A2 maps to cell:o4 of the source range 710, which was previously at location A2 in the source range 702, is cell:r4 in the destination range 712.

Location A3 maps to cell:o7 of the source range 710, which did not exist in the source range 702 or the destination range 704, so new cell:r7 is created in the destination range 712.

Location B1 maps to cell:o2 of the source range 710, which was previously at location B1 in the source range 702, is cell:r2 in the destination range 712.

Location B2 maps to cell:o8 of the source range 710, which did not exist in the source range 702 or the destination range 704, so new cell:r8 is created in the destination range 712.

Location B3 maps to cell:o5 of the source range 710, which was previously at location B2 in the source range 702, is cell:r5 in the destination range 712. (e.g., cell r3, r6)

Figure 7H:
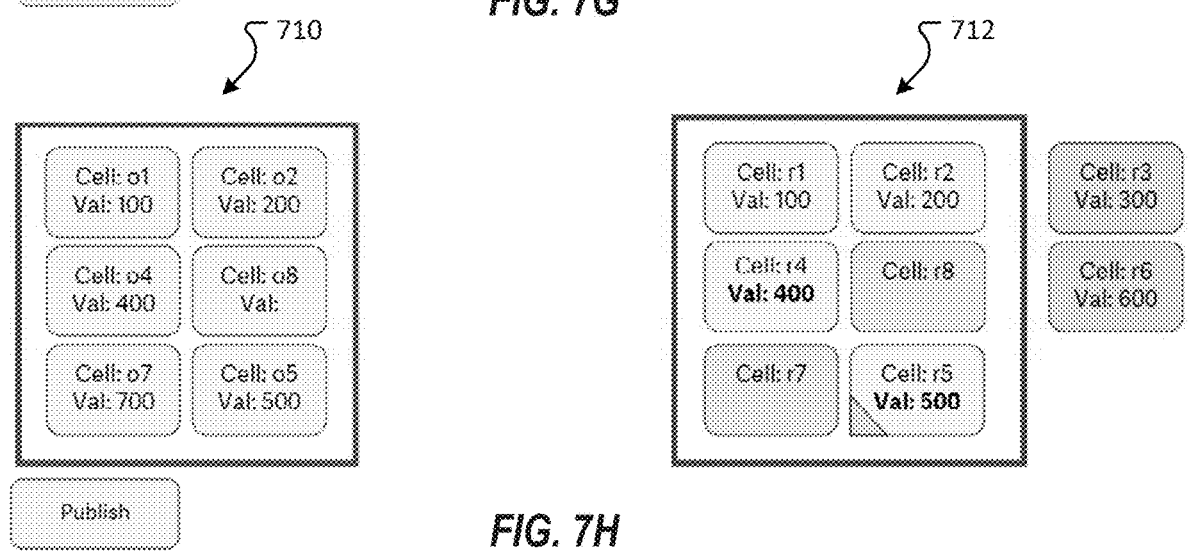
Figure 7I:
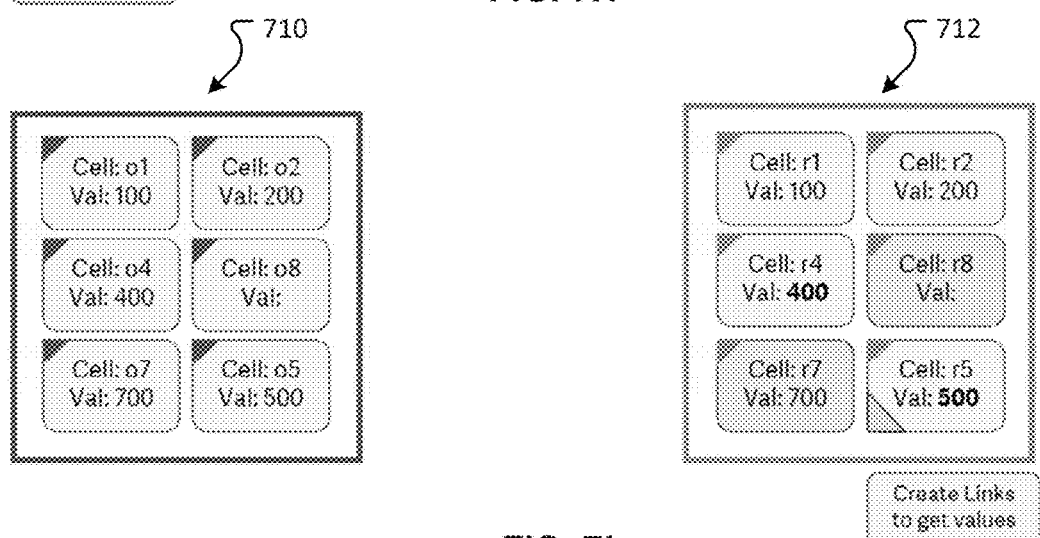

Additionally, cell links between the cells in the source and destination ranges 710, 712 are created, as illustrated in FIGS. 7H and 7I. In other words, each cell within a linked range has an individual cell link. The cell links between the cells (e.g., point-to-point linking) in the source and destination ranges 710, 712 allows data values, formats, and metadata to flow through from the source range. As shown in FIG. 7H, the cells from the previous destination range 704 that have not changed in the updated source range 710 are readded with existing data values, formats, and metadata, such that any changes that may have been made in the previous destination range 704 (e.g., bolding of cell r4, r5 and a comment in cell r5 in this example) are carried over to the updated destination range 712. Additionally, as shown in FIG. 7I, data values, formats, and metadata of the new cells (e.g., cell r7, r8) are pushed from the source range 710. It should be appreciated that the cells that are not included in the mapping (e.g., cell r3, r6) are deleted after publish.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, solid state drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the disclosure.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the disclosure unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the disclosure (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method for establishing a range link between source and destination ranges, the method carried out by one or more computing devices and comprising:

creating a first source range from a range of cells in a source document;

creating a first destination range in a destination document by creating a range link between the first source range and the first destination range to replicate the first source range;

detecting a second source range, the second source range including an unpublished update comprising a structural change to the first source range;

in response to detecting the second source range, activating an inactive publish button on a user interface of the one or more computing devices to become an active publish button, and an indication to publish the unpublished update of the second source range is generated in response to a user action to the active publish button; and in response to receiving the indication to publish the unpublished update of the second source range, updating the range link between the first source range and the first destination range to propagate the structural change to create a second destination range.

2. The method of claim 1, wherein updating the range link between the first source range and the first destination range comprises coordinating cell locations between the first source range and the first destination range to determine new cell locations of the second destination range that correspond to the structural change of the second source range.

3. The method of claim 1, wherein updating the range link between the first source range and the first destination range comprises:

generating a mapping of the second source range to the first source range, the mapping including the structural changes to the first source range;

creating the modified destination range by creating a range sync between the second source range and the second destination range to coordinate cell locations based on the mapping and synchronize structural characteristics of the second source range to the second destination range; and managing cell links between the cells in the second source range and the second destination range to synchronize cell characteristics of the second source range to the second destination range.

4. The method of claim 3, wherein the cell characteristics of the second source range include data values, formats, and/or metadata of cells within the second source range.

5. The method of claim 3, wherein creating the range sync between the second source range and the second destination range comprises determining new cell locations of the second destination range based on the mapping of the second source range.

6. The method of claim 5, wherein creating the second destination range comprises:

deleting all cells of the first destination range;

adding one or more cells from the first destination range that remain in the second source range to the second destination range; and creating one or more new cells at the respective new cell locations in the second destination range.

7. The method of claim 5, wherein creating the second destination range comprises:

deleting a first set of cells of the first destination range that correspond to one or more cells of the first source range that were modified in the second source range based on the mapping;

moving a second set of cells from the first destination range that remain in the second source range to the second destination range based on the mapping; and creating one or more new cells at the respective new cell locations in the second destination range based on the mapping.

8. The method of claim 6, wherein adding the one or more cells from the first destination range that remain in the second source range to the second destination range comprises:

adding the one or more cells from the first destination range to the second destination range with any characteristic changes made to the one or more cells in the first destination.

9. The method of claim 1, wherein creating the first source range further comprises:
  detecting an indication to create the first source range from a selected range of cells in the source document;
  creating the first source range by creating a source range link for the selected range of cells; and
  generating a mapping of the first source range, wherein the mapping of the first source range maps universally unique identifiers (UUIDs) of the cells to corresponding locations of the respective cells.

10. The method of claim 1, wherein creating the first destination range further comprises:
  detecting an indication to insert the first source range selected from the source document in the destination document as a range link;
  creating a range sync to replicate a range structure of the first source range at the first destination range; and
  creating cell links between cells in the first source range and the first destination range to propagate cell characteristics of the first source range.

11. The method of claim 1, further comprising:
  receiving a range link removal request from the destination document; and
  in response to receiving the range link removal request, removing the range link from the destination document.

12. A computing device that establishes a range link between source and destination ranges, the computing device comprising a processor and a non-transitory computer-readable memory, wherein the processor is configured to carry out instructions from the memory that configure the computing device to:
  create a first source range from a range of cells in a source document;
  create a first destination range in a destination document by creating a range link between the first source range and the first destination range to replicate the first source range;
  detect a second source range, the second source range including an unpublished update comprising a structural change to the first source range;
  in response to the second source range being detected, activate an inactive publish button on a user interface of the computing device to become an active publish button, and an indication to publish the unpublished update of the second source range is generated in response to a user action to the active publish button;
  in response to receiving the indication to publish the unpublished update of the second source range, update the range link between the first source range and the first destination range to propagate the structural change to create a second destination range.

13. The computing device of claim 12, wherein to update the range link between the first source range and the first destination range comprises coordinating cell locations between the first source range and the first destination range to determine new cell locations of the second destination range that correspond to the structural change of the second source range.

14. The computing device of claim 12, wherein to update the range linking between the first source range and the first destination range comprises:
  generating a mapping of the second source range to the first source range, the mapping including the structural changes to the first source range;
  creating the modified destination range by creating a range sync between the second source range and the second destination range to coordinate cell locations based on the mapping; and
  managing cell links between the cells in the second source range and the second destination range to synchronize cell characteristics of the second source range to the second destination range,
  wherein the cell characteristics of the second source range include data values, formats, and/or metadata of cells within the second source range.

15. The computing device of claim 14, wherein to create the range sync between the second source range and the second destination range comprises determining new cell locations of the second destination range based on the mapping of the second source range.

16. The computing device of claim 15, wherein to create the second destination range comprises to:
  delete all cells of the first destination range;
  add one or more cells from the first destination range that remain in the second source range to the second destination range; and
  create one or more new cells at the respective new cell positions in the second destination range.

17. The computing device of claim 16, wherein to add the one or more cells from the first destination range that remain in the second source range to the second destination range comprises to add the one or more cells from the first destination range to the second destination range with any characteristic changes made to the one or more cells in the first destination.

18. The computing device of claim 12, wherein to create the first source range further comprises to:
  detect an indication to create the first source range from a selected range of cells in the source document;
  create the first source range by creating a source range link for the selected range of cells; and
  generate a mapping of the first source range, wherein the mapping of the first source range maps universally unique identifiers (UUIDs) of the cells to corresponding locations of the respective cells.

19. The computing device of claim 12, wherein to create the first destination range further comprises to:
  detect an indication to insert the first source range selected from the source document in the destination document as a range link;
  create a range sync to replicate a range structure of the first source range at the first destination range; and
  create cell links between cells in the first source range and the first destination range to propagate cell characteristics of the first source range.

20. The computing device of claim 12, wherein the processor is configured to carry out instructions from the memory that configure the computing device to:
  receive a range link removal request from the destination document; and
  in response to the range link removal request, remove the range link from the destination document.

* * * * *